United States Patent
Balthes et al.

(10) Patent No.: US 8,227,037 B2
(45) Date of Patent: *Jul. 24, 2012

(54) METHODS OF MAKING FIRE RETARDANT PANEL COMPOSITIONS

(75) Inventors: Garry E. Balthes, Elkhart, IN (US);
Darrell R. Eggers, Bristol, IN (US);
Gregg B. Baumbaugh, Noblesville, IN (US)

(73) Assignee: FlexForm Technologies, LLC, Elkhart, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/047,089

(22) Filed: Mar. 14, 2011

(65) Prior Publication Data

US 2012/0064329 A1 Mar. 15, 2012

Related U.S. Application Data

(63) Continuation of application No. 11/650,075, filed on Jan. 5, 2007, now Pat. No. 7,906,176, which is a continuation-in-part of application No. 11/305,745, filed on Dec. 16, 2005, now Pat. No. 8,012,889.

(60) Provisional application No. 60/637,020, filed on Dec. 17, 2004.

(51) Int. Cl.
*B05D 3/00* (2006.01)
*B05D 1/12* (2006.01)

(52) U.S. Cl. ..................................... 427/294; 427/180
(58) Field of Classification Search .................. 427/180, 427/294
See application file for complete search history.

(56) References Cited

U.S. PATENT DOCUMENTS

| | | | | |
|---|---|---|---|---|
| 2,288,072 A * | 6/1942 | Collins | ........................ | 264/116 |
| 2,476,588 A * | 7/1949 | Dreher | ........................ | 156/212 |
| 3,103,031 A * | 9/1963 | Winston | ..................... | 15/104.93 |
| 4,118,526 A * | 10/1978 | Gregorian et al. | ............ | 427/350 |
| 4,144,288 A * | 3/1979 | Miano | ........................... | 524/112 |
| 4,363,680 A * | 12/1982 | Buck et al. | ...................... | 216/83 |
| 5,149,606 A * | 9/1992 | Bullock et al. | ................ | 429/228 |
| 5,151,127 A * | 9/1992 | Thompson | ................. | 106/15.05 |
| 5,852,102 A * | 12/1998 | Thyssen | ........................ | 524/540 |
| 2002/0061963 A1 * | 5/2002 | Thames et al. | ................... | 525/30 |

* cited by examiner

*Primary Examiner* — Nathan Empie
(74) *Attorney, Agent, or Firm* — Barnes & Thornburg LLP

(57) ABSTRACT

A fire retardant structural board is provided that includes a body of fibrous material, a triglycidyle polyester binder, a sodium borate pentahydride fire retardant, and a sodium borate pentahydride fire retardant. The body of fibrous material has a weight, first and second surfaces, first and second sides, and a thickness. The fibrous material and triglycidyle polyester are dispersed throughout the thickness of the body. The sodium borate pentahydride fire retardant is dispersed between individual fibers of the fibrous material and throughout the thickness of the body. A sodium borate pentahydride fire retardant composition also coats at least the first surface of the body.

18 Claims, 26 Drawing Sheets

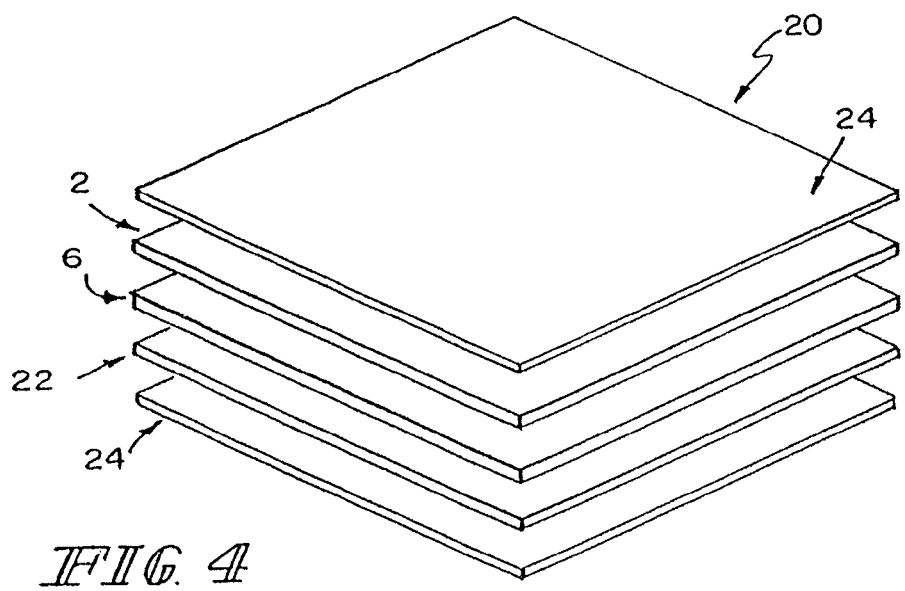
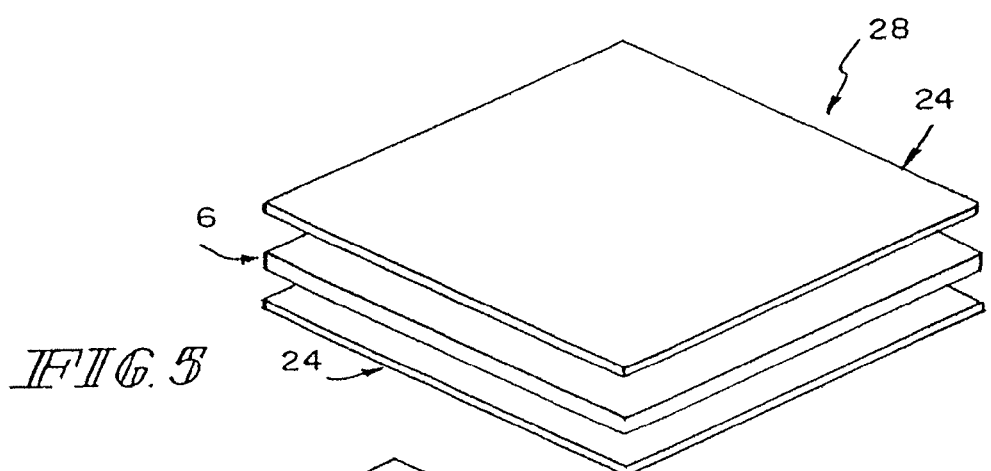
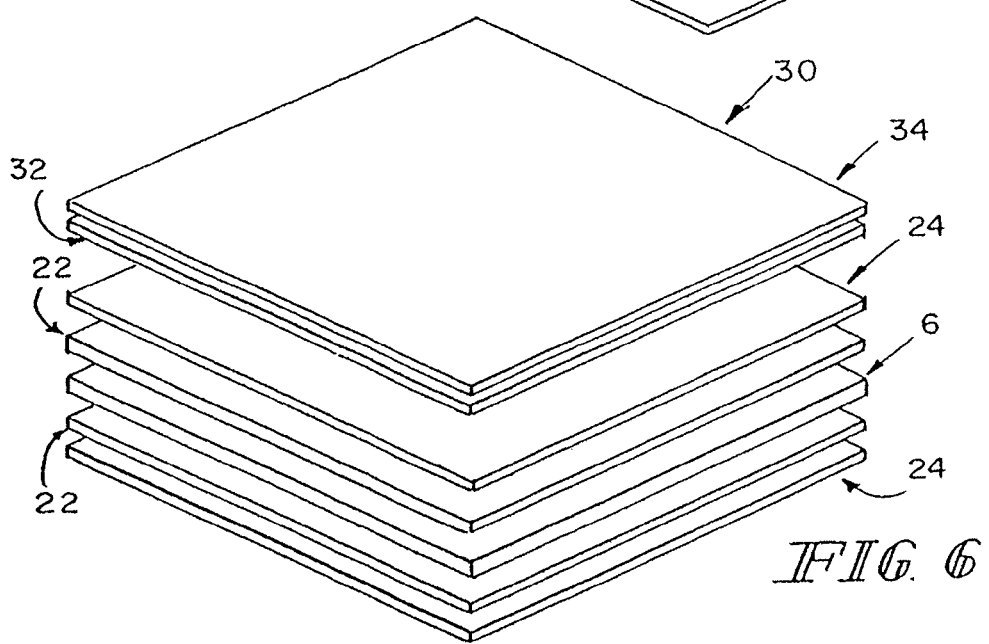

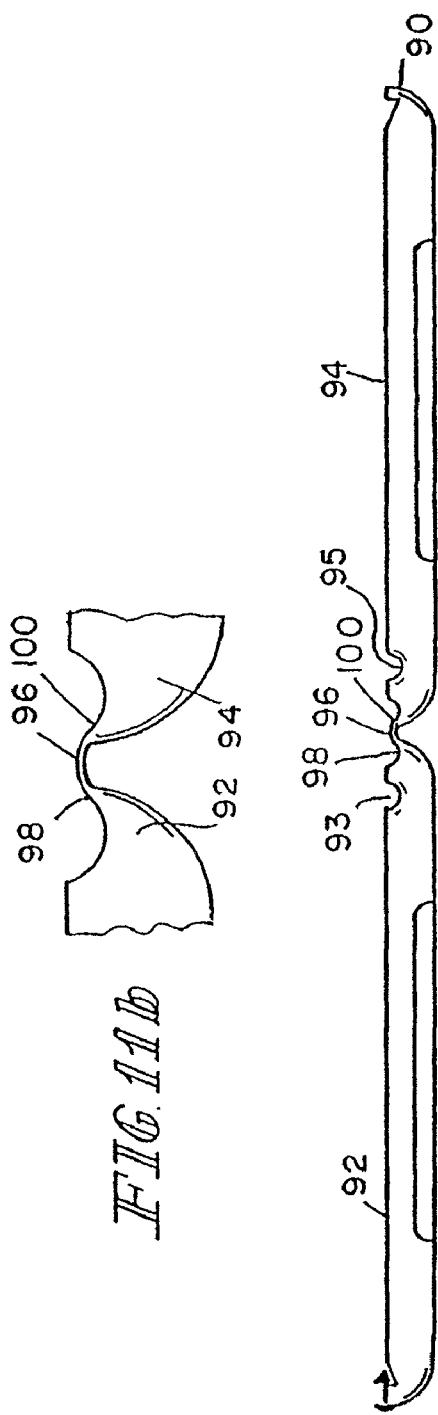

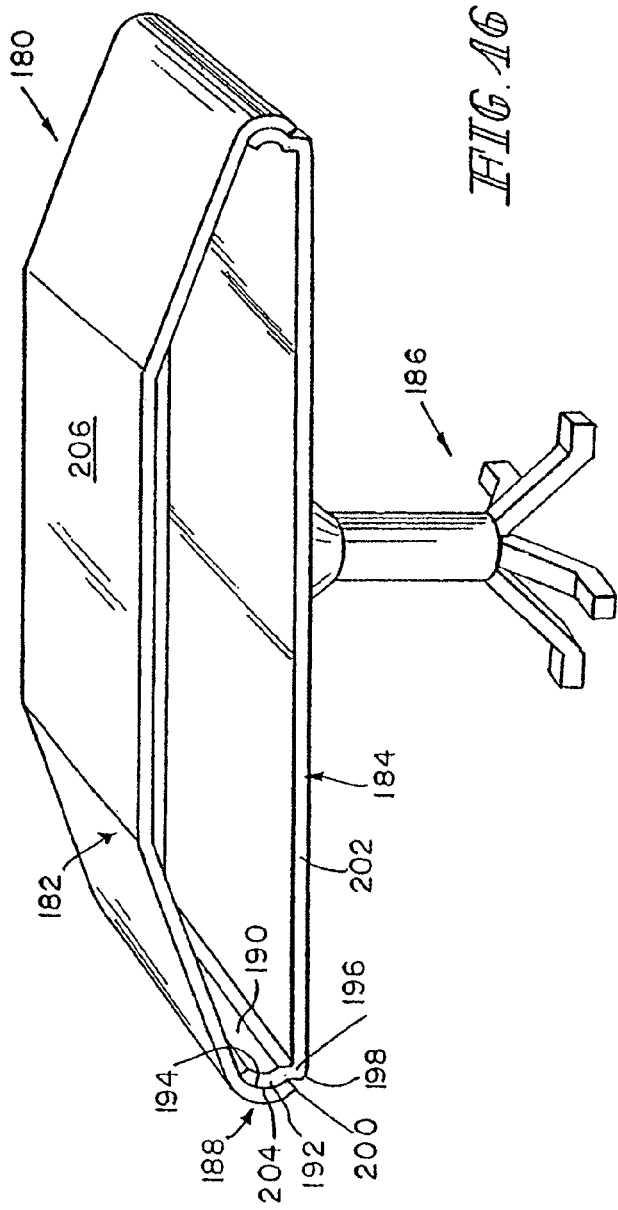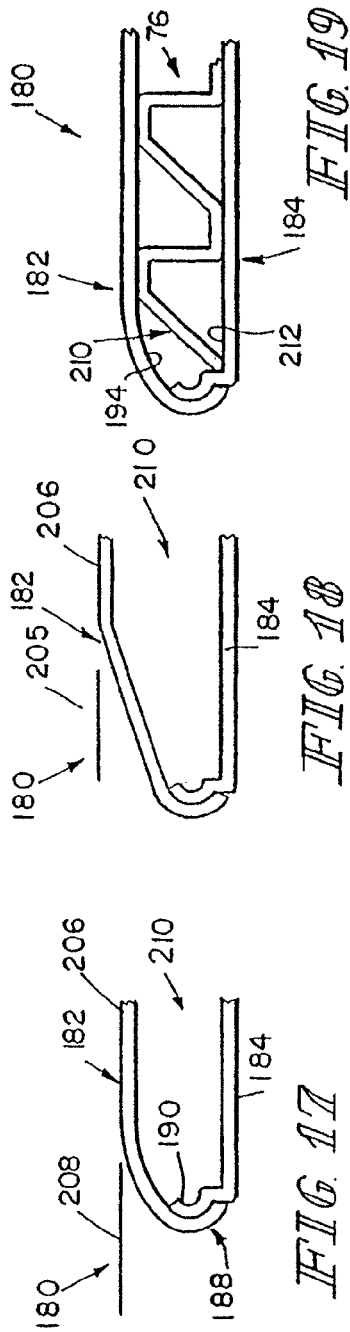

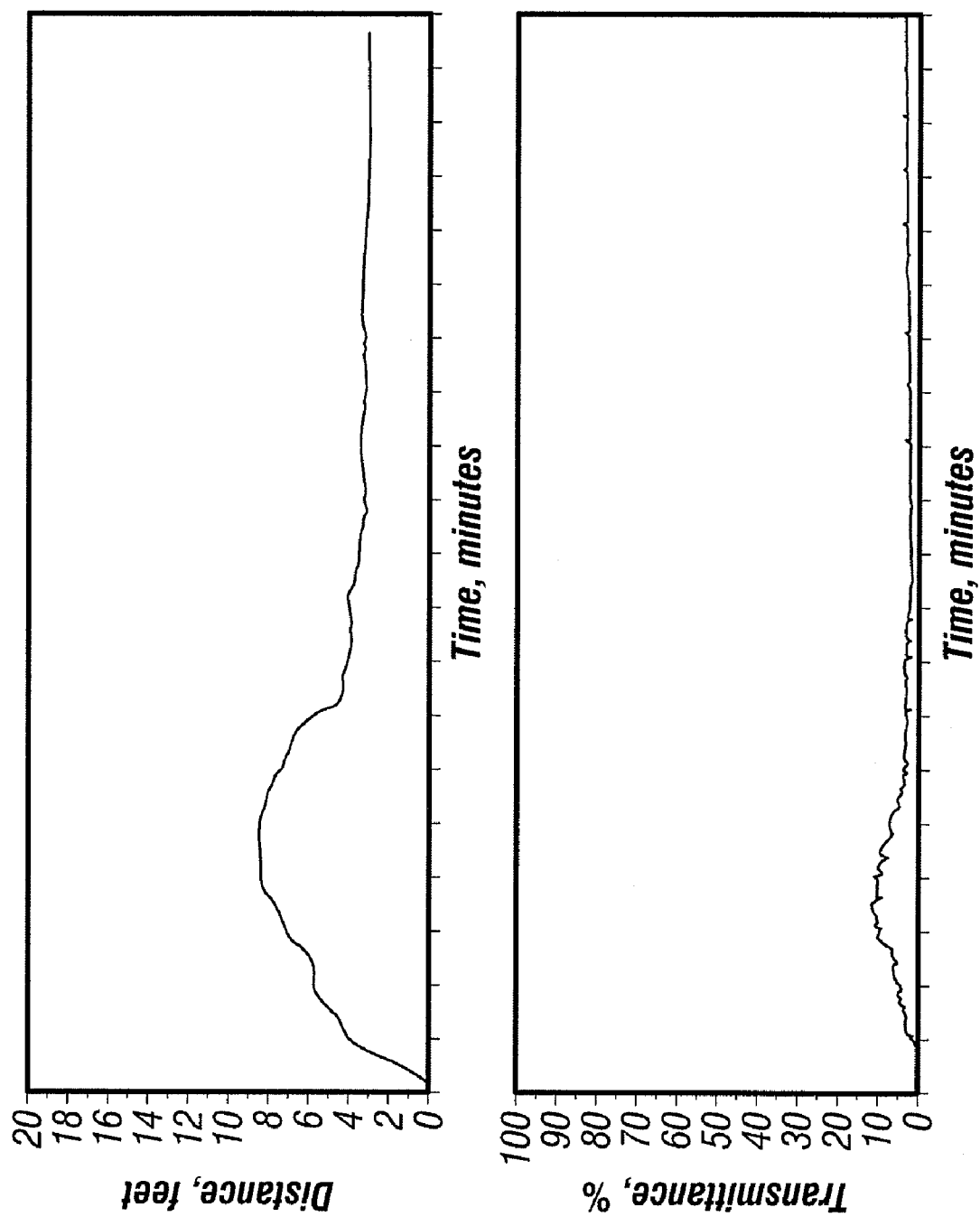

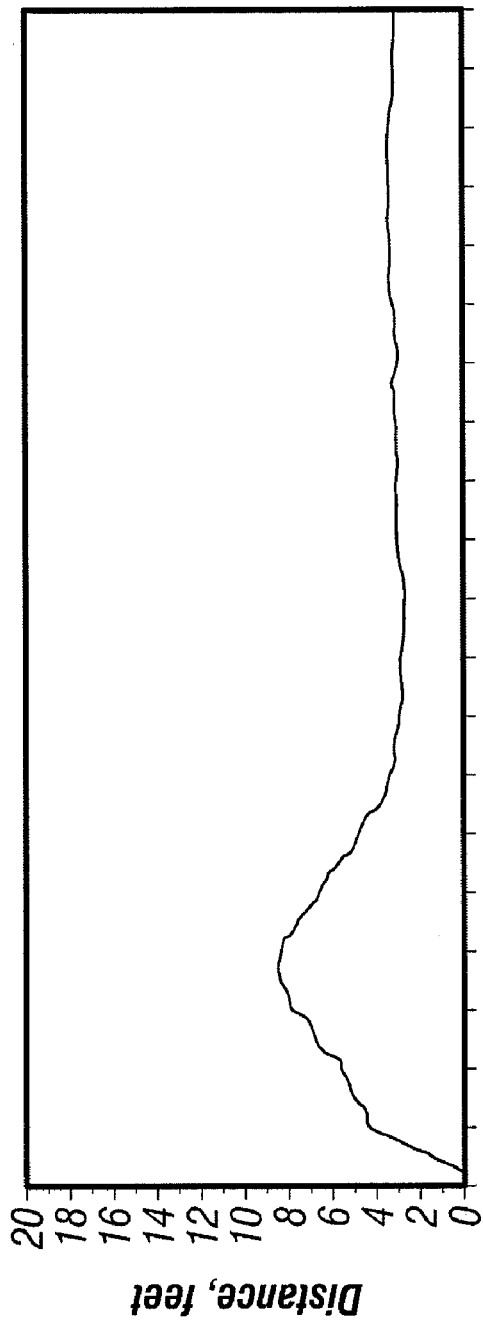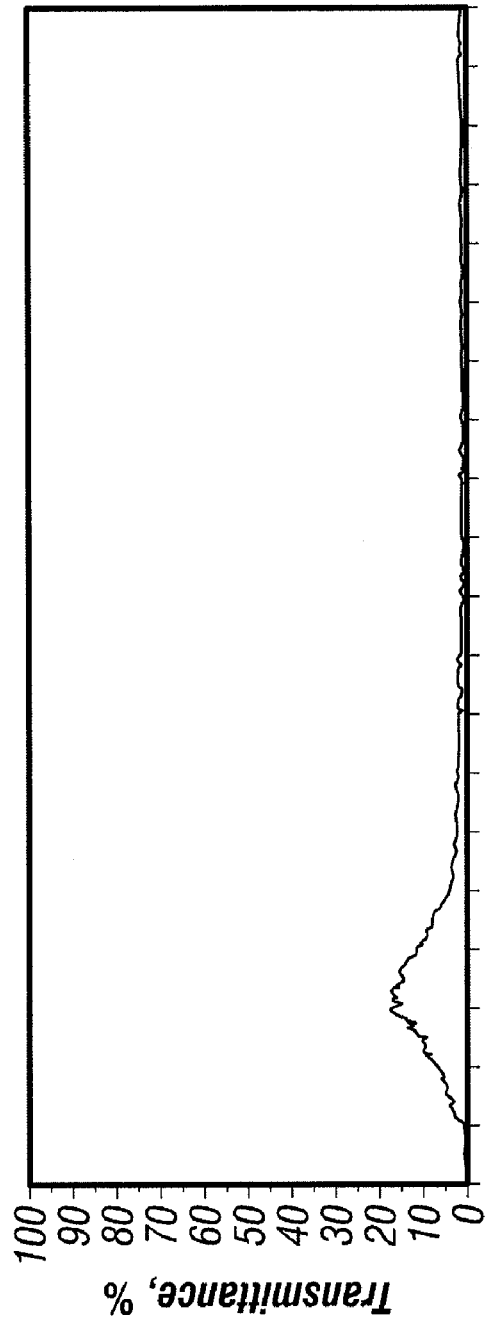
FIG. 39 Graphs 3 (top) and 4 (bottom)

METHODS OF MAKING FIRE RETARDANT PANEL COMPOSITIONS

RELATED APPLICATIONS

The present application is a continuation application of U.S. patent application Ser. No. 11/650,075 filed on Jan. 5, 2007 now U.S. Pat. No. 7,906,176 entitled Fire Retardant Panel Composition and Methods of Making Same which is a continuation-in-part application of U.S. application Ser. No. 11/305,745, filed on Dec. 16, 2005, now U.S. Pat. No. 8,012,889 entitled Fire Retardant Panel Composition and Methods of Making Same which claims priority to U.S. Provisional Patent Application Ser. No. 60/637,020, filed on Dec. 17, 2004, entitled Fire Retardant Panel Composition. The disclosures of all of these applications to the extent not explicitly disclosed herein is expressly incorporated herein by reference.

TECHNICAL FIELD

The present disclosure relates to fiber mats, boards, panels, laminated composites, structures, and processes of making the same. More particularly, a portion of the present disclosure is related to fire retardant structural boards and methods of making the same.

BACKGROUND AND SUMMARY

Industry is consistently moving away from wood and metal structural members and panels, particularly in the vehicle manufacturing industry. Such wood and metal structural members and panels have high weight to strength ratios. In other words, the higher the strength of the wood and metal structural members and panels, the higher the weight. The resulting demand for alternative material structural members and panels has, thus, risen proportionately. Because of their low weight to strength ratios, as well as their corrosion resistance, such non-metallic panels have become particularly useful as structural members in the vehicle manufacturing industry as well as office structures industry, for example.

Often such non-metallic materials are in the form of composite structures or panels which are moldable into three-dimensional shapes for use in any variety of purposes. It would, thus, be beneficial to provide a composite material structure that has high strength using oriented and/or non-oriented fibers with bonding agents having compatible chemistries to provide a strong bond across the composite's layers. It would be further beneficial to provide a manufacturing and finish coating process for such structures in some embodiments.

It will be appreciated that the prior art includes many types of laminated composite panels and manufacturing processes for the same. U.S. Pat. No. 4,539,253, filed on Mar. 30, 1984, entitled High Impact Strength Fiber Resin Matrix Composites, U.S. Pat. No. 5,141,804, filed on May 22, 1990, entitled Interleaf Layer Fiber Reinforced Resin Laminate Composites, U.S. Pat. No. 6,180,206 B1, filed on Sep. 14, 1998, entitled Composite Honeycomb Sandwich Panel for Fixed Leading Edges, U.S. Pat. No. 5,708,925, filed on May 10, 1996, entitled Multi-Layered Panel Having a Core Including Natural Fibers and Method of Producing the Same, U.S. Pat. No. 4,353,947, filed Oct. 5, 1981, entitled Laminated Composite Structure and Method of Manufacture, U.S. Pat. No. 5,258,087, filed on Mar. 13, 1992, entitled Method of Making a Composite Structure, U.S. Pat. No. 5,503,903, filed on Sep. 16, 1993, entitled Automotive Headliner Panel and Method of Making Same, U.S. Pat. No. 5,141,583, filed on Nov. 14, 1991, entitled Method of and Apparatus for Continuously Fabricating Laminates, U.S. Pat. No. 4,466,847, filed on May 6, 1983, entitled Method for the Continuous Production of Laminates, and U.S. Pat. No. 5,486,256, filed on May 17, 1994, entitled Method of Making a Headliner and the Like, are all incorporated herein by reference to establish the nature and characteristics of such laminated composite panels and manufacturing processes herein. It would be beneficial to provide a structural board that has fire retardant properties, as well as provide methods of making the panel.

An illustrative embodiment of the present disclosure provides a low-density fire retardant structural board which comprises a body of fibrous material, a binder and fire retardant agent. The body of fibrous material includes a weight, first and second ends, first and second sides and a thickness. The fibrous material is dispersed throughout the thickness of the body. The binder is dispersed throughout the thickness of the body. The fire retardant agent is dispersed between individual fibers of the fibrous material and throughout the thickness of the body.

In the above and other embodiments, the fire retardant structural board may further comprise: the fire retardant agent comprising borate; the fire retardant agent comprising phosphate; the binder being an epoxy; the fibrous material being a natural fiber material; the fibrous material being a synthetic fiber material; the structural board being rated at least Class B according to ASTM International Fire Test E-84; the fire retardant agent being in a concentration from about 5% to about 30% based on the weight of the body of fibrous material; the binder being in a concentration from about 5% to about 30% based on the weight of the body of fibrous material; the body further comprising a surface having a fire retardant composition applied thereon; any portion of the surface that is to be exposed to flame, be completely coated with the applied fire retardant composition; the applied fire retardant composition comprising a borate in a concentration from about 10% to about 40% based on the weight of the body of fibrous material; and the fire retardant composition comprising a phosphate in a concentration from about 10% to about 50% based on the weight of the body of fibrous material.

Another illustrative embodiment of the present disclosure provides a low-density fire retardant structural board which comprises a body of fibrous material, a binder, a fire retardant agent, and a fire retardant composition. The body of fibrous material has a weight, first and second ends, first and second sides, first and second surfaces, and a thickness. The fibrous material is dispersed throughout the thickness of the body. The binder is dispersed throughout the thickness of the body. The fire retardant agent dispersed between individual fibers of the fibrous material and throughout the thickness of the body. The fire retardant composition is applied to the first surface of the body.

In the above and other embodiments, the fire retardant structural board may further comprise: the fire retardant composition being applied to the second surface of the body; wherein the fire retardant agent comprising a borate; the fire retardant agent comprising a phosphate; the binder being an epoxy; the structural board being rated at least class A according to ASTM International Fire Test E-84; the fire retardant agent being in a concentration from about 5% to about 30% based on the weight of the body of fibrous material; the binder being in a concentration from about 5% to about 30% based on the weight of the body of fibrous material; the applied fire retardant composition comprising a borate that is in a concentration from about 10% to about 40% based on the weight of the body of fibrous material; the fire retardant composition comprising a phosphate that is in a concentration from about 10% to about 50% based on the weight of the body of fibrous material; and any portion of the surface that is to be exposed to flame, be completely coated with the applied fire retardant composition.

Another illustrative embodiment of the present disclosure provides a method of manufacturing a low-density fire retardant structural board, the method comprising the steps of: providing a structural mat having a weight, thickness, first and second surfaces, and comprising a fibrous material dispersed throughout the thickness of the mat; applying a binder into the thickness of the mat from the first surface of the structural mat; applying a fire retardant material into the thickness of the mat from the first surface of the structural mat; heating the structural mat; applying a binder into the thickness of the mat from the second surface of the structural mat; and applying a fire retardant material into the thickness of the mat from the second surface of the structural mat to cure the fire retardant material.

In the above and other embodiments, the fire retardant structural board may further comprise the steps of: blowing the binder and the fire retardant material onto the mat, and applying a vacuum underneath the mat opposite the blown binder and fire retardant material to draw the binder and the fire retardant material into the thickness of the mat; heating the structural mat by applying hot air at about 350 degrees F. for about 30 seconds; facing the first surface of the mat upward; further comprising the steps of rotating the mat so the second surface of the mat faces upward; collecting the binder and fire retardant material not applied at the first surface of the mat, and applying them to the second surface of the mat; using the binder and fire retardant material collected and not used on first surface of the mat; blowing the binder and fire retardant material onto the second surface of the mat; applying a vacuum underneath the mat and opposite the blown binder and fire retardant material to draw the binder and the fire retardant material into the thickness of the mat; applying a liquid fire retardant material to the mat and curing the liquid fire retardant material; providing the liquid fire retardant material with a borate that is in a concentration from about 10% to about 40% based on the weight of the body of fibrous material; and providing the liquid fire retardant material with a phosphate that is in a concentration from about 10% to about 50% based on the weight of the body of fibrous material.

Another illustrative embodiment of the disclosure provides a fire retardant structural board comprises a body of natural fibrous material, a triglycidyle polyester binder, a sodium borate pentahydride fire retardant, and a sodium borate pentahydride fire retardant. The body of natural fibrous material has a weight, first and second surfaces, first and second sides, and a thickness. The natural fibrous material and triglycidyle polyester are dispersed throughout the thickness of the body. The sodium borate pentahydride fire retardant is dispersed between individual natural fibers of the natural fibrous material and throughout the thickness of the body. A sodium borate pentahydride fire retardant composition also coats at least the first surface of the body.

In the above and other embodiments, the fire retardant structural board may further comprise: the triglycidyle polyester comprising calcium carbonate and 1,3,5-triglycidyle isocyanurate; the amount of sodium borate pentahydride being 30% or more of the total weight of the board; about 67% by weight sodium borate pentahydride being dispersed between individual natural fibers throughout the thickness of the body, and wherein about 33% may be applied to at least the first surface of the body; the sodium borate pentahydride fire retardant composition being an aqueous composition which also includes a surfactant, an adhesive, and water; the aqueous composition further comprising about 40% sodium borate pentahydride as dry solids, about 1% surfactant, about 1% adhesive, and the balance water; the triglycidyle polyester binder being a resin formulated to be about 5% to about 40% of the weight of the natural fibrous material; about 50% to about 100% natural fibrous material, and comprising about 0% to about 50% synthetic fiber having a melting temperature above about 200 degrees; and the triglycidyle polyester binder further comprising a hardener.

Another illustrative embodiment of the present disclosure provides a fire retardant structural board comprising a body of natural fibrous material, an epoxy powder resin binder, and a sodium borate pentahydride fire retardant. The body of natural fibrous material has a weight, first and second surfaces, first and second sides and a thickness. The natural fibrous material is dispersed throughout the thickness of the body. The epoxy powder resin binder is dispersed throughout the thickness of the body. The borate pentahydride fire retardant is dispersed between individual natural fibers of the natural fibrous material and throughout the thickness of the body, and applied to at least the first surface of the body.

In the above and other embodiments, the fire retardant structural board may further comprise the epoxy powder including a triglycidyle polyester.

Another illustrative embodiment of the present disclosure provides a method of manufacturing a fire retardant structural board, the method comprising the steps of: providing a structural mat having a weight, thickness, first and second surfaces, and comprising a fibrous material dispersed throughout the thickness of the mat; applying a first application of triglycidyle polyester binder and sodium borate pentahydride onto the first surface and into the thickness of the structural mat; heating the structural mat; applying a second application of triglycidyle polyester binder and sodium borate pentahydride onto the second surface and into the thickness of the structural mat; heating the structural mat again; compressing the mat to a desired thickness; and coating the first surface of the mat with a composition that includes sodium borate penta hydride.

In the above and other embodiments, the method of manufacturing the fire retardant structural board may further comprise the steps of: applying the first application of triglycidyle polyester binder and sodium borate pentahydride at a rate of about 200 grams per square meter of total fibrous mat weight, and heating the mat for about 30 seconds at about 175 degrees Celsius using a hot air recirculating oven; applying the second application of triglycidyle polyester binder and sodium borate pentahydride onto the second surface of the structural mat at rate of about 200 grams per square meter of total fibrous mat weight, and heating the resin for about 60 seconds at about 175 degrees Celsius; cooling the structural mat after compressing and before coating; coating the second surface of the mat with the composition that includes sodium borate penta hydride; coating the first surface using a surface spray applicator; coating the first surface using a foam generator system which foams the composition of sodium borate pentahydride liquid into an applicable foam density, and dispersing the foam onto the first surface where the foam collapses at a rate that allows the composition to wick into the surface of the mat; warming the first surface to solidify the composition.

Additional features and advantages of this disclosure will become apparent to those skilled in the art upon consideration of the following detailed description of illustrated embodiments exemplifying the best mode of carrying out such embodiments as presently perceived.

BRIEF DESCRIPTION OF DRAWINGS

The present disclosure will be described hereafter with reference to the attached drawings which are given as non-limiting examples only, in which:

FIG. 4 is another embodiment of a laminated hardboard panel;

FIG. 5 is another embodiment of a laminated hardboard panel;

FIG. 6 is another embodiment of a laminated hardboard panel;

FIG. 11a is a side view of an illustrative hinged visor body in the open position;

FIG. 11b is a detail view of the hinge portion of the visor body of FIG. 11a;

FIG. 12a is a side view of an illustrative hinged visor body in the folded position;

FIG. 12b is a detail view of the hinge portion of the visor body of FIG. 12a;

FIG. 16 is a work body;

FIG. 17 is a sectional end view of a portion of the work body of FIG. 16 showing an illustrative connection between first and second portions;

FIG. 18 is a sectional end view of a portion of the work body of FIG. 16 showing another illustrative connection between first and second portions;

FIG. 19 is a sectional end view of a portion of the work body of FIG. 16 showing another illustrative connection between first and second portions;

FIG. 28 is another top view of the shear and trim stages as well as the finishing stage of the hardboard manufacturing line of FIG. 20;

FIG. 38 is graphs showing test results; and

FIG. 39 is graphs showing test results.

Corresponding reference characters indicate corresponding parts throughout the several views. The exemplification set out herein illustrates several embodiments, and such exemplification is not to be construed as limiting the scope of this disclosure in any manner.

DETAILED DESCRIPTION OF THE DRAWINGS

Figure 1:
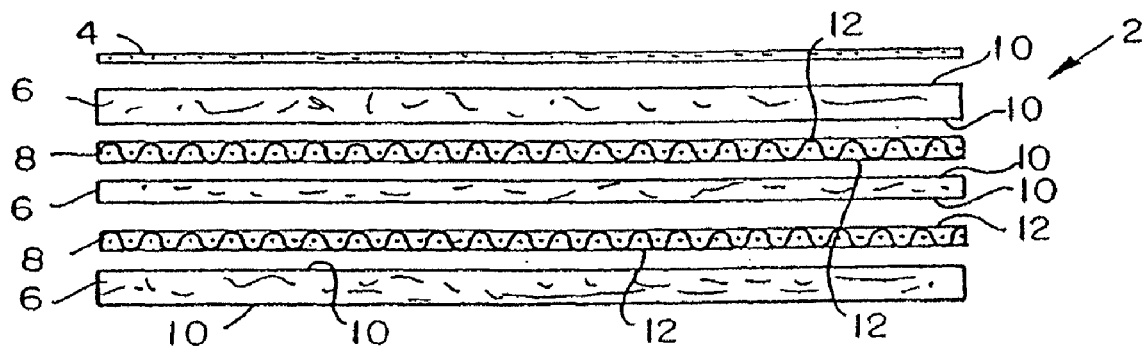
FIG. 1 is an exploded side view of a laminated hardboard panel.

An exploded side view of a laminated composite hardboard panel 2 is shown in FIG. 1. Hardboard panel 2 illustratively comprises a fascia cover stock 4 positioned as the surface layer of panel 2. Fascia cover stock 4 may be comprised of fabric, vinyl, leathers, acrylic, epoxies, or polymers, etc. It is appreciated, however, that hardboard panel 2 may include, or not include, such a fascia cover.

The laminated composite hardboard panel 2 illustratively comprises a first sheet of fibrous material layer 6. Fibrous material layer 6 illustratively comprises a natural fiber, illustratively about 25 weight percent hemp and about 25 weight percent kenaf with the balance being illustratively polypropylene. The fibers are randomly oriented to provide a non-specific orientation of strength. Variations of this fibrous material are contemplated including about 24.75 weight percent hemp and about 24.75 weight percent kenaf combination with about 50 weight percent polypropylene and about 0.05 weight percent maleic anhydride. Other such fibrous materials can be used as well, such as flax and jute. It is also contemplated that other blend ratios of the fibrous material can be used to provide a nonspecific orientation of strength. It is further contemplated that other binders in place of polypropylene may also be used for the purpose discussed further herein. Furthermore, it is contemplated that other fibrous materials which have high process temperatures in excess of about 400 degrees F., for example, may be used as well.

A woven fiber layer 8 illustratively comprises a woven glass with a polypropylene binder, and is illustratively located between the fibrous material layers 6. It is appreciated that other such woven, non-metal fiber materials may be used in place of glass, including nylon, Kevlar, fleece and other natural or synthetic fibers. Such woven fiber provides bi-directional strength. In contrast, the fibrous material layers 6 provide nonspecific-directional strength, thus giving the resulting composite enhanced multi-directional strength.

Each surface 10 of fibrous material layers 6 that is adjacent to woven material layer 8 bonds to surfaces 12 of layer 8. A bond is created between fibrous material layer 6 and woven material layer 8 by a high temperature melt and pressure process as discussed further herein. Because the glass and fibrous layers have compatible binders (i.e., the polypropylene, or comparable binder), layers 6, 8 will melt and bind, forming an amalgamated bond between the same. Layers 6, 8 having polypropylene as a common chain in each of their respective chemistries makes the layers compatible and amenable to such three-dimensional molding, for example.

Figure 3:
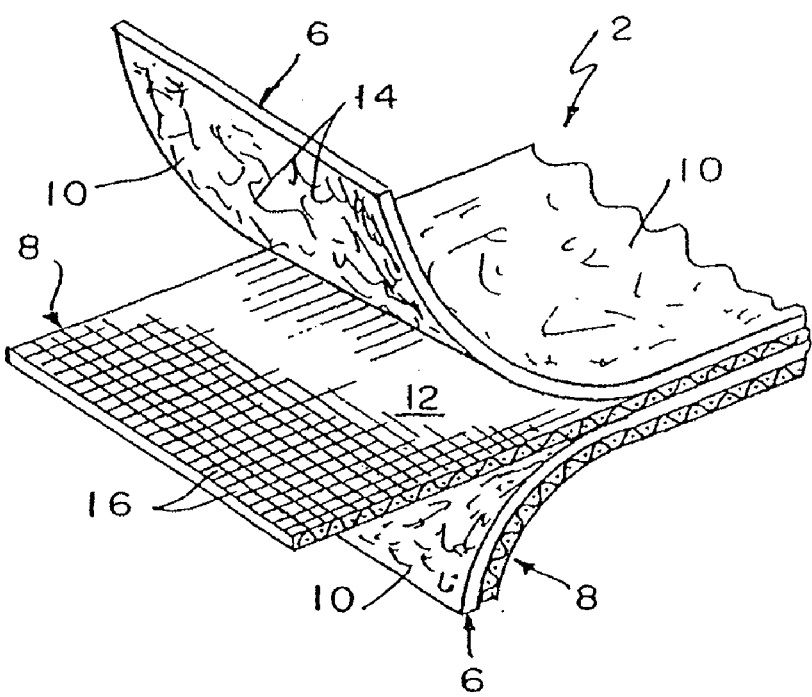
FIG. 3 is a perspective view of a portion of the laminated hardboard panel of FIG. 1 showing partially-pealed plies of woven and non-woven material layers.

It is appreciated that panel 2 may comprise a plurality of fibrous material layers 6, with woven material layers 8 laminated between each pair of adjacent surfaces 10 and 12, respectively. A pealed view of hardboard panel 2, shown in FIG. 3, illustrates such combined use of woven and nonspecific-directional or randomly-oriented fibers. The random fibers 14 make up fibrous material layer 6, whereas the woven fibers 16 make up the fiber layer 8. Because bulk mass can increase the strength of the panel, it is contemplated that more alternating fibrous and woven fiber layers used in the laminated composite will increase the strength of the panel. The number of layers used, and which layer(s) will be the exterior layer(s), can be varied, and is often dictated by the requirements of the particular application.

Testing was conducted on illustrative hardboard panels to demonstrate tensile and flexural strength. The hardboard laminated material consisted of a first layer of 600 gram 80 percent polypropylene 20 percent polyester fleece, a second layer of 650 gram fiberglass mix (75 percent 0.75K glass/25 percent polypropylene and 10 percent maleic anhydride), a third layer 1800 gram 25 percent hemp/25 percent kenaf with 5 percent maleic anhydride and the balance polypropylene, a fourth layer of the 650 g fiberglass mix, and a fifth layer of the 600 g 80 percent polypropylene 20 percent polyester fleece. This resulted in an approximate 4300 gram total weight hardboard panel.

The final panel was formed by subjecting it to a 392 degrees F. oven with a 6 millimeter gap and heated for about 400 seconds. The material was then pressed using a 4.0 millimeter gap. The final composite panel resulted in an approximate final thickness of 4.30 millimeter.

To determine such panel's tensile and flexural properties, ASTM D 638-00 and ASTM D790-00 were used as guidelines. The panel samples' shape and size conformed to the specification outlined in the standards as closely as possible, but that the sample thickness varied slightly, as noted above. A Tinius Olson Universal testing machine using industry specific fixtures was used to carry out the tests.

Figure 34:
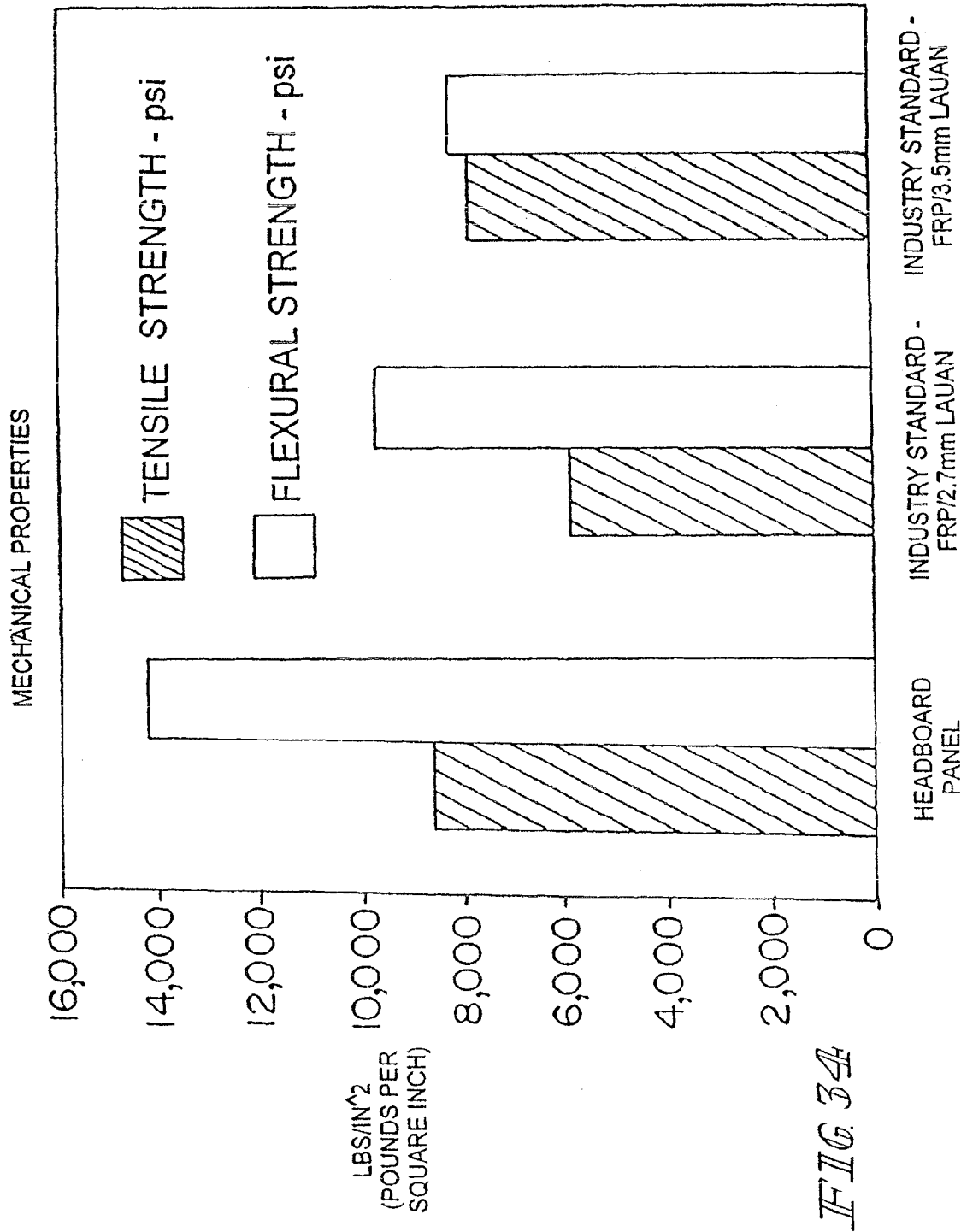
FIG. 34 is a mechanical properties chart comparing the tensile and flexural strength of an illustrative laminated hardboard panel with industry standards.
Figure 35:
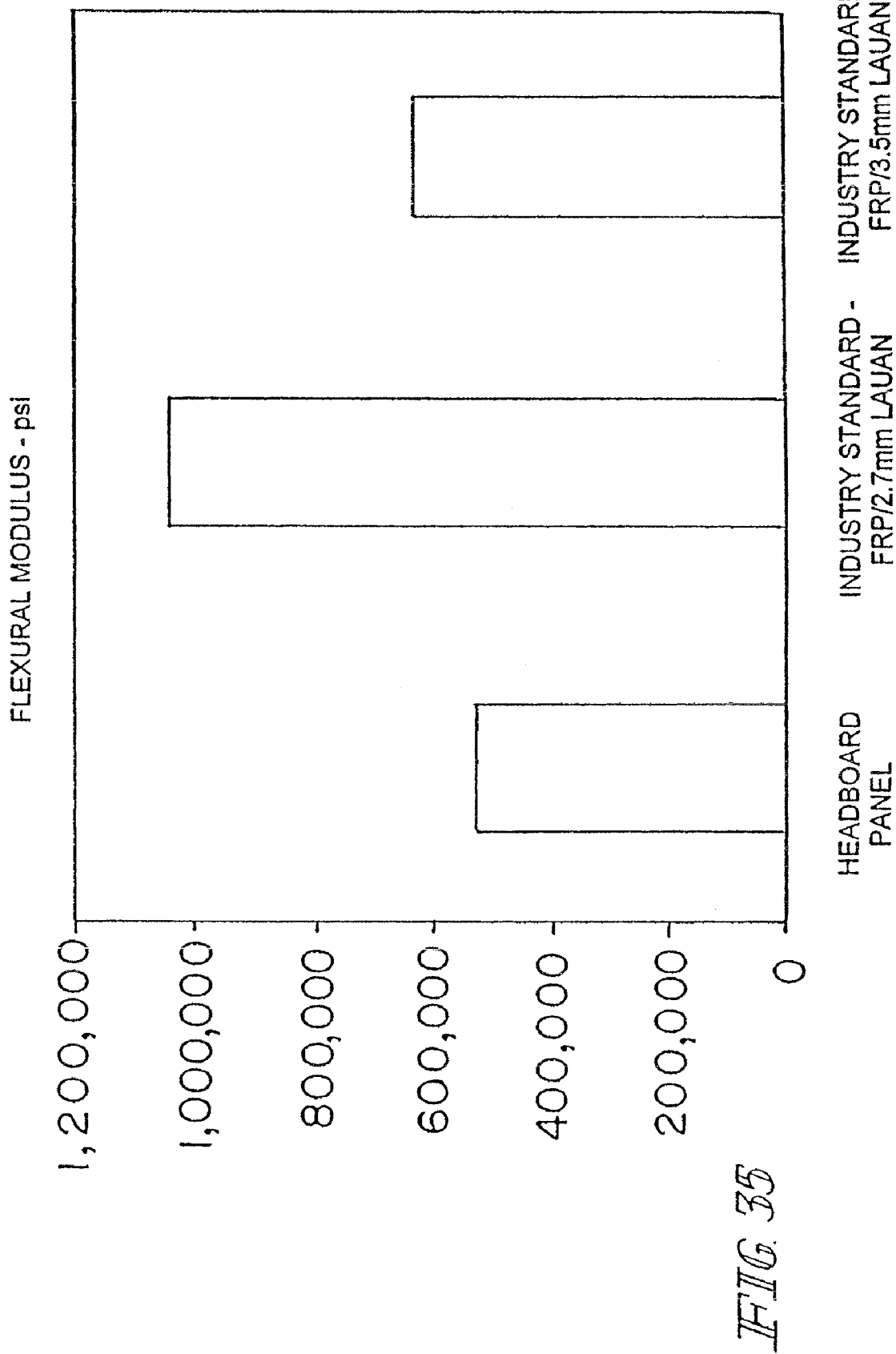
FIG. 35 is a mechanical properties chart comparing the flexural modulus of an illustrative laminated hardboard panel with industry standards.

Two lauan boards were coated with a gelcoat finish and formed into final 2.7 millimeter and 3.5 millimeter thickness boards, respectively. These boards were used as a baseline for comparison with the hardboard panel of the present disclosure. Each of the samples was then cut to the shape and sizes pursuant the above standards. The tensile and flexural properties of the lauan boards were determined in the same manner as the hardboard panel above. Once the results were obtained they were then charted against the results of the hardboard panel for comparison, as shown below and in FIGS. 34 and 35. The results herein represent the average over 10 tested samples of each board.

| Panel Description | Avg. Tensile Strength - psi | Avg. Flexural Strength - psi | Avg. Flexural Modulus - psi |
|---|---|---|---|
| Hardboard panel | 8,585 | 14,228 | 524,500 |
| Industry standard - FRP/2.7 mm lauan | 5,883 | 9,680 | 1,045,700 |
| Industry standard - FRP/3.5 mm lauan | 7,900 | 8,260 | 624,800 |

Figure 2:
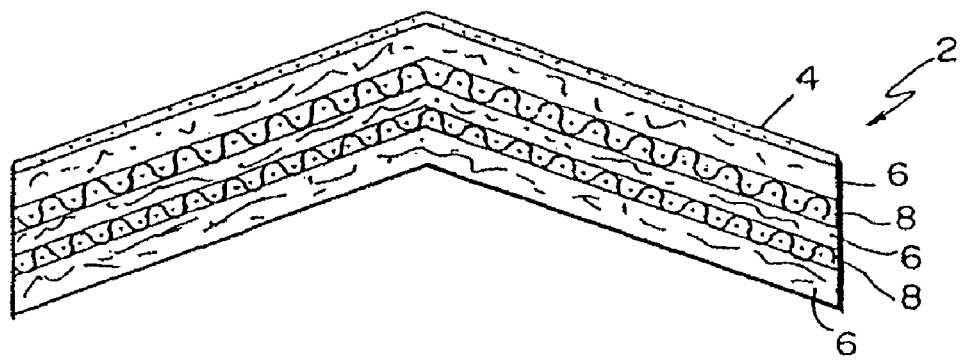
FIG. 2 is a side view of the laminated hardboard panel of FIG. 1 in an illustrative-shaped configuration.

As depicted by FIG. 2, laminated panel 2 can be formed into any desired shape by methods known to those skilled in the art. It is appreciated that the three-dimensional molding characteristics of several fibrous sheets in combination with the structural support and strength characteristics of glass/polypropylene weave materials located between pairs of the fibrous sheets will produce a laminated composite material that is highly three-dimensionally moldable while maintaining high tensile and flexural strengths. Such a laminated panel is useful for the molding of structural wall panel systems, structural automotive parts, highway trailer side wall panels (exterior and interior), recreational vehicle side wall panels (exterior and interior), automotive and building construction load floors, roof systems, modular constructed wall systems, and other such moldable parts. Such a panel may replace styrene-based chemical set polymers, metal, tree cut lumber, and other similar materials. It is believed that such a moldable laminated panel can reduce part cost, improve air quality with reduced use of styrene, and reduce part weight. Such a panel may also be recyclable, thereby giving the material a presence of sustainability.

Another embodiment of a hardboard panel 20 is shown in FIG. 4. This panel 20 comprises a fibrous material layer 6 serving as the core, and is bounded by fiberglass layers 22 and fleece layers 24, as shown. For example, the fibrous material layer 6 may comprise the conventional non-oriented fiber/polypropylene mix as previously discussed, at illustratively 1800 or 2400 g weights. The fiberglass layer comprises a 50 weight percent polypropylene/about 50 weight percent maleic polypropylene (illustratively 400 g/m$^2$) mix. The fleece layer comprises an about 50 weight percent polypropylene/about 50 weight percent polyester (illustratively 300 g/m$^2$) mix. The fleece material provides good adhesion with the polypropylene and is water-proof at ambient conditions. Furthermore, the polyester is a compatible partner with the polypropylene because it has a higher melt temperature than the polypropylene. This means the polypropylene can melt and bond with the other layer without adversely affecting the polyester. In addition, the maleic anhydride is an effective stiffening agent having high tensile and flexural strength which increases overall strength of the panel.

It is contemplated that the scope of the invention herein is not limited only to the aforementioned quantities, weights and ratio mixes of material and binder. For example, the fleece layer 24 may comprise an about 80 weight percent polypropylene/about 20 weight percent polyester (illustratively 600 g/m$^2$) mix. The laminated composite panel 20 shown in FIG. 4 may include, for example, both fleece layers 24 comprising the 50/50 polypropylene/polyester mix, or one layer 24 comprising the 50/50 polypropylene/polyester mix, or the 80/20 polypropylene/polyester mix. In addition, same as panel 2, the binder used for panel 20 can be any suitable binder such as polypropylene, for example.

Another embodiment of a laminated hardboard panel 28 is shown in FIG. 5. This panel 28 comprises a fibrous material layer 6 serving as the core which is bounded by fleece layers 24, as shown. As with panel 20, the fibrous material layer 6 of panel 28 may comprise the conventional, non-oriented fiber/polypropylene mix as previously discussed, at illustratively 1800 or 2400 g weights. Each fleece layer 24 may comprise an about 50 weight percent polypropylene/about 50 weight percent polyester (illustratively 300 g/m$^2$) mix, or may alternatively be an about 80 weight percent polypropylene/about 20 weight percent polyester (illustratively 600 g/m$^2$) mix. Or, still alternatively, one fleece layer 24 may be the 50/50 mix and the other fleece layer 24 may be the 80/20 mix, for example.

Another embodiment of a laminated hardboard panel 30 is shown in FIG. 6. This panel 30, similar to panel 20 shown in FIG. 4, comprises a fibrous material layer 6 serving as the core which is bounded by fiberglass layers 22 and fleece layers 24. The formulations for and variations of the fleece layer 24, the fiberglass layers 22 and the fibrous material layer 6 may comprise the formulations described in the embodiment of panel 20 shown in FIG. 4. Laminated panel 30 further comprises a calendared surface 32, and illustratively, a prime painted or coated surface 34. The calendaring process assists in making a Class A finish for automobile bodies. A Class A finish is a finish that can be exposed to weather elements and still maintain its aesthetics and quality. For example, an embodiment of the coated surface 34 contemplated herein is designed to satisfy the General Motors Engineering standard for exterior paint performance: GM4388M, rev. June 2001. The process for applying the painted or coated finish is described with reference to the calendaring process further herein below.

Further illustrative embodiment of the present disclosure provides a moldable panel material, for use as a headliner, for example, comprising the following constituents by weight percentage:
 about 10 weight percent polypropylene fibers consisting of polypropylene (about 95 weight percent) coupled with maleic anhydride (about 5 weight percent), though it is contemplated that other couplers may work as well;
 about 15 weight percent kenaf (or similar fibers such as hemp, flax, jute, etc.) fiber pre-treated with an anti-fungal/anti-microbial agent containing about 2 weight percent active ingredient; wherein the fibers may be pre-treated off-line prior to blending;
 about 45 weight percent bi-component (about 4 denier) polyester fiber; wherein the bi-component blend ratio is about 22.5 weight percent high melt (about 440 degrees F.) polyester and about 22.5 weight percent low melt polyester (about 240 to about 300 degrees F. which is slightly below full melt temperature of polypropylene to permit control of polypropylene movement during heat phase); wherein, alternatively, like fibers of similar chemistry may also be used; and
 about 30 weight percent single component polyester fiber (about 15 denier) high melt (about 440 degrees F.); wherein, alternatively, like fibers of similar chemistry may be used.

Again, such a material can be used as a headliner. This is because the formulation has a higher heat deflection created by stable fibers and high melt polypropylene, and by polyester and the cross-linked polymer to the polymer of the fibers. Furthermore, coupled polypropylene has cross-linked with non-compatible polyester low melt to form a common melt combined polymer demonstrating higher heat deflection ranges. The anti-fungal treated natural fiber protects any cellulous in the fiber from colonizing molds for the life of the product should the head liner be exposed to high moisture conditions.

It is appreciated that other formulations can work as well. For example, another illustrative embodiment may comprise about 40 percent bi-component fiber with 180 degree C. melt temperature, about 25 percent single component PET-15 denier; about 15 percent G3015 polypropylene and about 20 percent fine grade natural fiber. Another illustrative embodiment may comprise about 45 percent bi-component fiber semi-crystalline 170 degree C. melt temperature, about 20 percent single component PET-15 denier, about 15 percent low melt flow (10-12 mfi) polypropylene and about 20 percent fine grade natural fiber. It is further contemplated that such compositions disclosed herein may define approximate boundaries of usable formulation ranges of each of the constituent materials.

Figure 7:
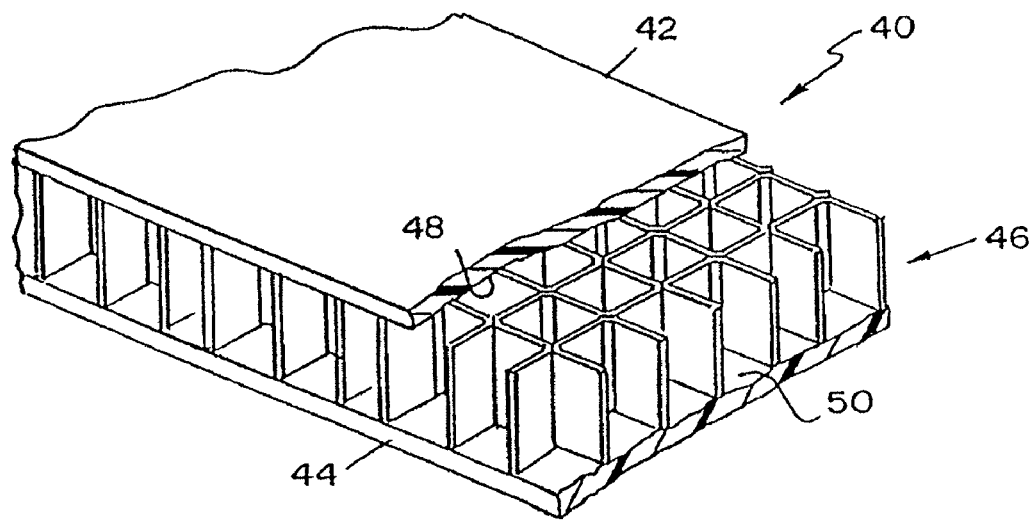
FIG. 7 is a perspective view of a honeycomb core laminated panel.

A cutaway view of a honeycomb composite panel 40 is shown in FIG. 7. The illustrated embodiment comprises top and bottom panels, 42, 44, with a honeycomb core 46 located there between. One illustrative embodiment provides for a polypropylene honeycomb core sandwiched between two panels made from a randomly-oriented fibrous material. The fibrous material is illustratively about 30 weight percent fiber and about 70 weight percent polypropylene. The fiber material is illustratively comprised of about 50 weight percent kenaf and about 50 weight percent hemp. It is contemplated, however, that any hemp-like fiber, such as flax or other cellulose-based fiber, may be used in place of the hemp or the kenaf. In addition, such materials can be blended at any other suitable blend ratio to create such suitable panels.

In one illustrative embodiment, each panel 42, 44 is heat-compressed into the honeycomb core 46. The higher polypropylene content used in the panels provides for more thermal plastic available for creating a melt bond between the panels and the honeycomb core. During the manufacturing of such panels 40, the heat is applied to the inner surfaces 48, 50 of panels 42, 44, respectively. The heat melts the polypropylene on the surfaces which can then bond to the polypropylene material that makes up the honeycomb core. It is appreciated, however, that other ratios of fiber to polypropylene or other bonding materials can be used, so long as a bond can be created between the panels and the core. In addition, other bonding materials, such as an adhesive, can be used in place of polypropylene for either or both the panels and the core, so long as the chemistries between the bonding materials between the panels and the core are compatible to create a sufficient bond.

Figure 8:
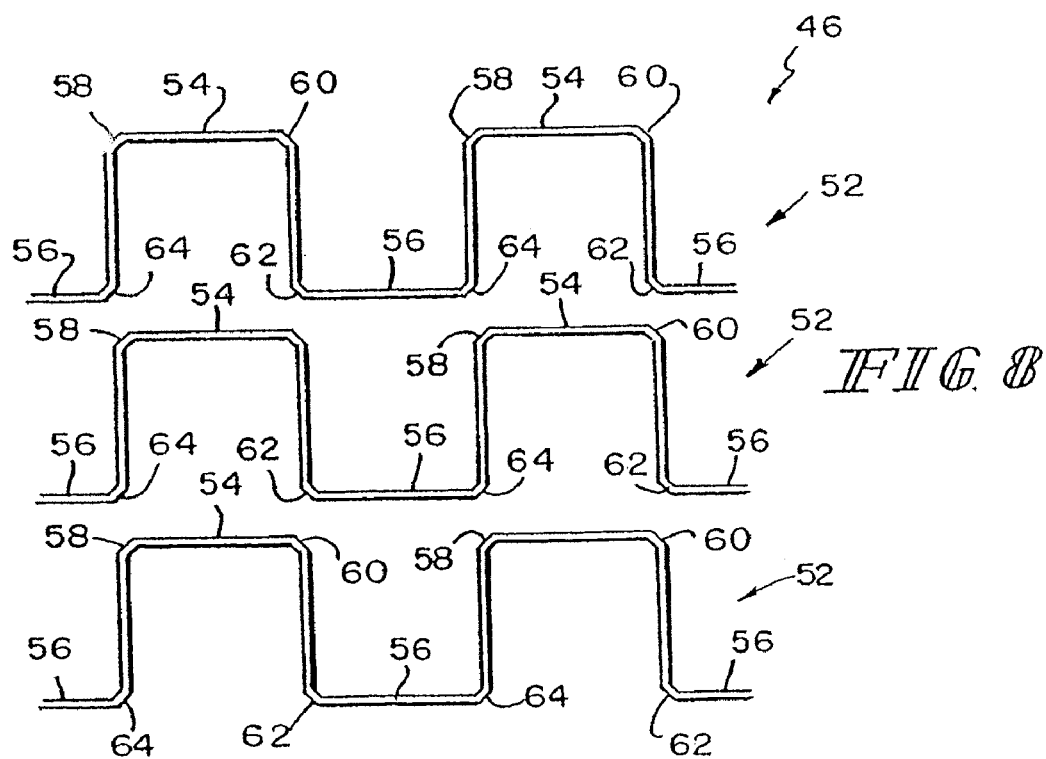
FIG. 8 is a top, exploded view of the honeycomb section of the panel of FIG. 7.
Figure 9:
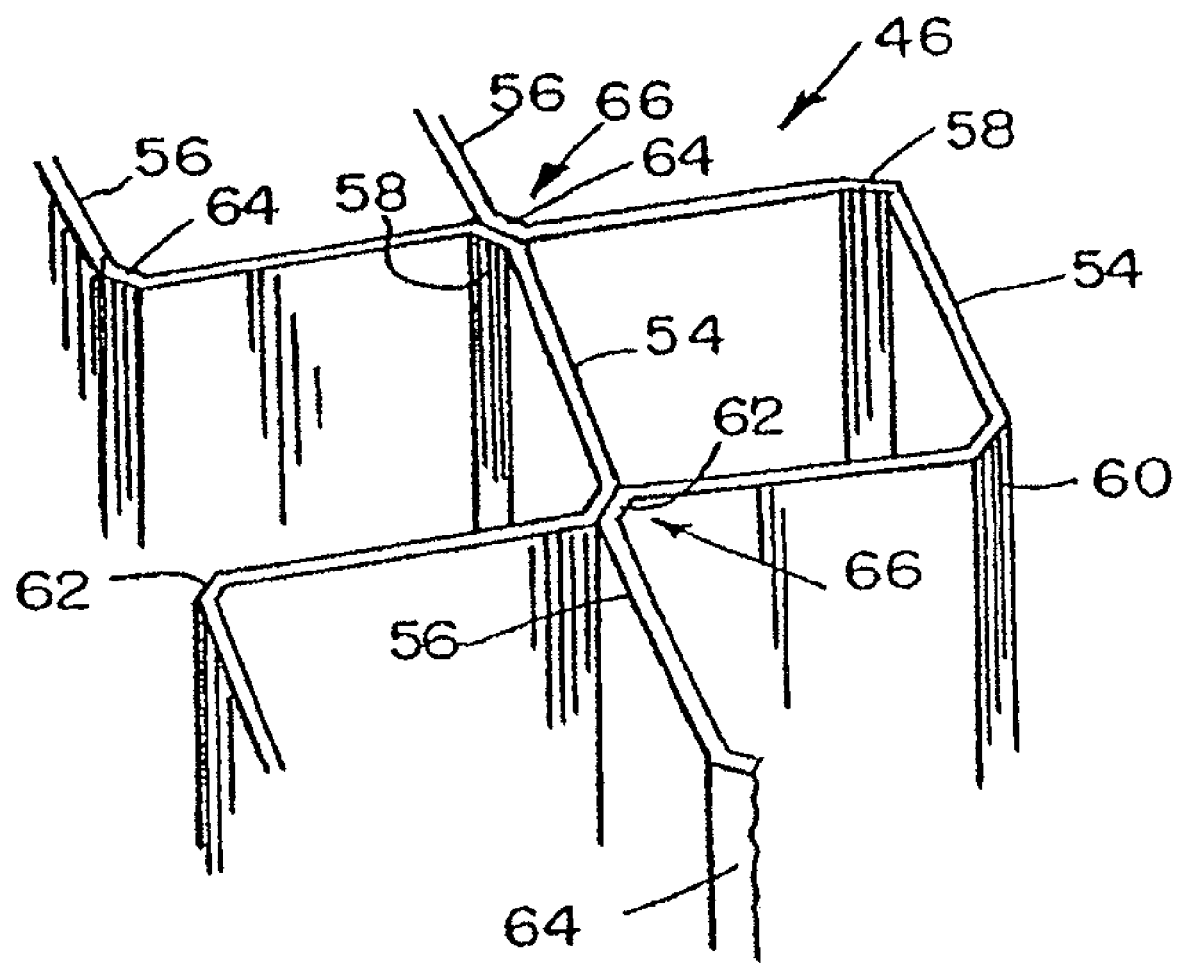
FIG. 9 is a perspective view of a portion of the honeycomb section of the panel of FIG. 7.

A top detail view of the one illustrative embodiment of honeycomb core 46 is shown in FIG. 8. This illustrative embodiment comprises individually formed bonded ribbons 52. Each ribbon 52 is formed in an illustrative battlement-like shape having alternating merlons 54 and crenellations 56. Each of the corners 58, 60 of each merlon 54 is illustratively thermally-bonded to each corresponding corner 62, 64, respectively, of each crenellation 56. Such bonds 66 which illustratively run the length of the corners are shown in FIG. 9. Successive rows of such formed and bonded ribbons 52 will produce the honeycomb structure, as shown.

Another embodiment of the honeycomb composite panel comprises a fibrous material honeycomb core in place of the polypropylene honeycomb core. Illustratively, the fibrous material honeycomb core may comprise about 70 weight percent polypropylene with about 30 weight percent fiber, for example, similar to that used for top and bottom panels 42, 44, previously discussed, or even a 50/50 weight percent mix.

Such formulations are illustrative only, and other formulations that produce a high strength board are also contemplated herein.

Figure 10:
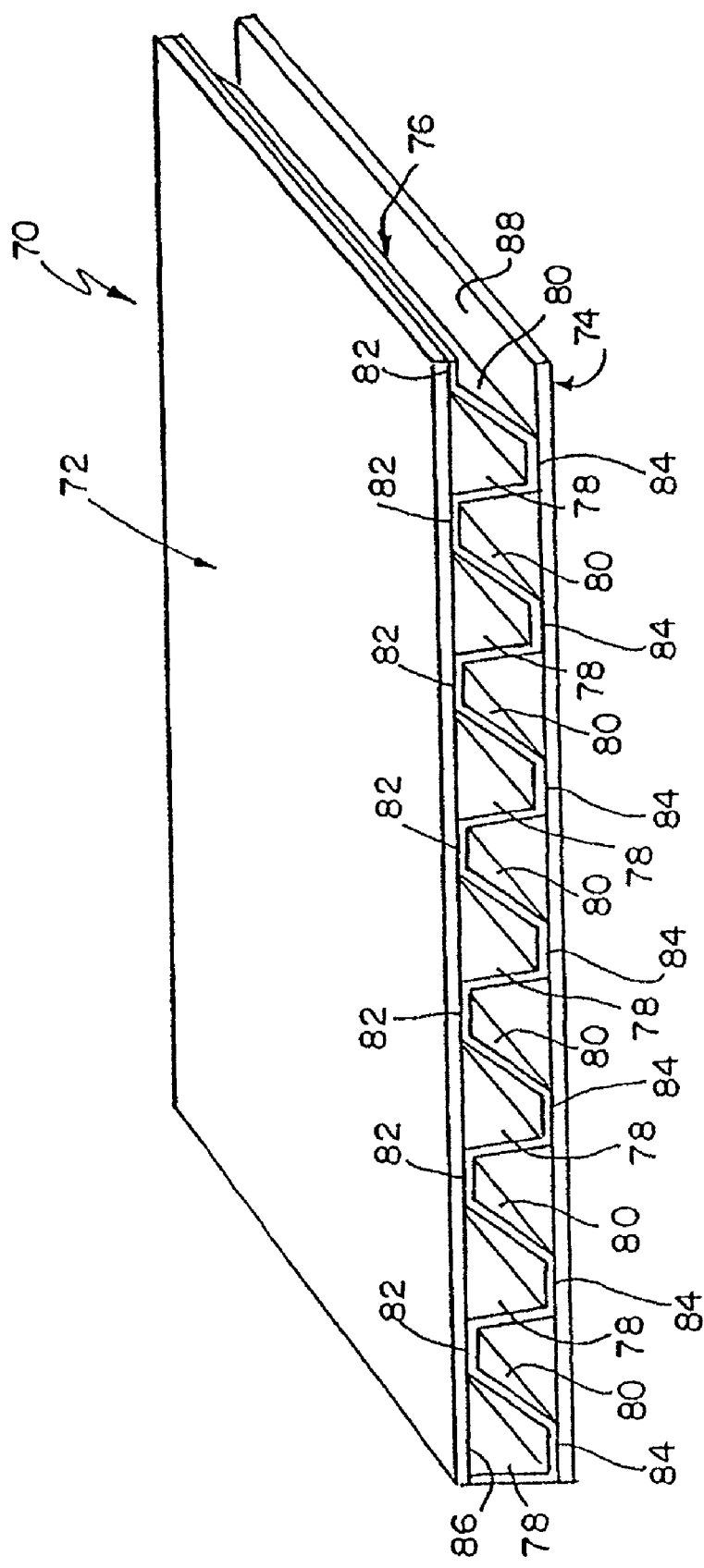
FIG. 10 is a perspective view of a truss core laminated panel.

A perspective view of a truss composite 70 is shown in FIG. 10. Truss panel composite 70 is a light weight, high strength panel for use in either two-or three-dimensional body panel applications. The illustrated embodiment of truss composite 70 comprises upper and lower layers 72, 74, respectively, which sandwich truss member core 76. Each of the layers 72, 74, 76 is made from a combination fibrous/polypropylene material, similar to that described in foregoing embodiments. Each layer 72, 74, 76 comprises a non-directional fibrous material, illustratively, about 25 weight percent hemp and about 25 weight percent kenaf with the balance being polypropylene. The fibers are randomly oriented to provide a non-specific orientation of strength. Illustrative variations of this fibrous material are contemplated, which may include, for example, an approximately 24.75 weight percent hemp and 24.75 weight percent kenaf combination with 50 weight percent polypropylene and 0.05 weight percent maleic anhydride. Other ratios of fibrous materials, however, are also contemplated to be within the scope of the invention. In addition, other fibrous materials themselves are contemplated to be within the scope of the invention. Such materials may be flax, jute, or other like fibers that can be blended in various ratios, for example. Additionally, it is appreciated that other binders in place of polypropylene may also be used to accomplish the utility contemplated herein.

The truss core 76 is illustratively formed with a plurality of angled support portions 78, 80 for beneficial load support and distribution. In the illustrated embodiment, support portion 78 is oriented at a shallower angle relative to upper and lower layers 72, 74, respectively, than support portion 80 which is oriented at a steeper angle. It is appreciated that such support portions can be formed by using a stamping die, continuous forming tool, or other like method. It is further appreciated that the thickness of any of the layers 72, 74, or even the truss core 76 can be adjusted to accommodate any variety of load requirements. In addition, the separation between layers 72, 74 can also be increased or decreased to affect its load strength.

Between each support portion is an alternating contact portion, either 82, 84. The exterior surface of each of the alternating contact portions 82, 84 is configured to bond to one of the inner surfaces 86, 88 of layers 72, 74, respectively. To create the bond between layers 72, 74 and truss core 76, superficial surface heat, about 450 degrees F. for polypropylene, is applied to the contact surfaces to melt the surface layer of polypropylene, similar to the process discussed further herein. At this temperature, the polypropylene or other binder material is melted sufficiently to bond same with the polypropylene of the core. In this illustrative embodiment, contact portion 82 bonds to the surface 86 of upper layer 72, and contact portion 84 bonds to the surface 88 of layer 74. Once solidified, a complete bond will be formed without the need for an additional adhesive. It is appreciated, however, that an adhesive may be used in place of surface heat bonding.

The outer surfaces of layers 72, 74 may be configured to accommodate a fascia cover stock (not shown). Such fascia cover stock may be comprised of fabric, vinyl, acrylic, leathers, epoxies, or polymers, paint, etc. In addition, the surfaces of layer 72, 74 may be treated with polyester to waterproof the panel.

An end view of a hinged visor body 90 is shown in FIG. 11a. This disclosure illustrates a visor, similar to a sun visor used in an automobile. It is appreciated, however, that such a visor body 90 is disclosed herein for illustrative purposes, and it is contemplated that the visor does not represent the only application of a formed hinged body. It is contemplated that such is applicable to any other application that requires an appropriate hinged body.

In the illustrated embodiment, body 90 comprises body portions 92, 94 and a hinge 96 positioned therebetween. (See FIGS. 11b and 12b.) Body 90 is illustratively made from a low density fibrous material, as further described herein below. In one embodiment, the fibrous material may comprise a randomly-oriented fiber, illustratively about 50 weight percent fiber-like hemp or kenaf with about 50 weight percent polypropylene. The material is subjected to hot air and to variable compression zones to produce the desired structure. (See further, FIG. 13.) Another illustrative embodiment comprises about 25 weight percent hemp and about 25 weight percent kenaf with the balance being polypropylene. Again, all of the fibers are randomly oriented to provide a non-specific orientation of strength. Other variations of this composition are contemplated including, but not limited to, about 24.75 weight percent hemp and about a 24.75 weight percent kenaf combination with about 50 weight percent polypropylene and about 0.05 weight percent maleic anhydride. Additionally, other fibrous materials are contemplated to be within the scope of this disclosure, such as flax and jute in various ratios, as well as the fibers in various other blend ratios. It is also appreciated that other binders in place of polypropylene may also be used for the utility discussed herein.

The illustrated embodiment of body 90 comprises hinge portion 96 allowing adjacent body portions 92, 94 to move relative to each other. The illustrative embodiment shown in FIGS. 11a and b depicts body 90 in the unfolded position. This embodiment comprises body portions 92, 94 having a thickness such that hinge portion 96 is provided adjacent depressions 98, 100 on the surface body portions 92, 94, respectively. Because body 90 is a unitary body, the flexibility of hinge portion 96 is derived from forming same into a relatively thin member, as herein discussed below. In such folding situations as shown in FIG. 12a, material adjacent the hinge may interfere with the body's ability to fold completely. These depressions 98, 100 allow body portions 92, 94 to fold as shown in FIG. 12a, without material from said body portions interfering therewith. As shown in FIG. 12b, a cavity 102 is formed when body portions 92, 94 are folded completely. It is contemplated, however, that such occasions may arise wherein it may not be desired to remove such material adjacent hinge portion 96, as depicted with depressions 98, 100. Such instances are contemplated to be within the scope of this disclosure.

In the illustrative embodiment shown in FIG. 11b, hinge portion 96 forms an arcuate path between body portions 92, 94. The radii assist in removing a dimple that may occur at the hinge when the hinge is at about 180 degrees of bend. As shown in FIG. 12b, hinge portion 96 loses some of its arcuate shape when the body portions 92, 94 are in the folded position. It is appreciated, however, that such a hinge 96 is not limited to the arcuate shape shown in FIG. 11a. Rather, hinge portion 96 may be any shape so long as it facilitates relative movement between two connecting body portions. For example, hinge portion 96 may be linear shaped. The shape of the hinge portion may also be influenced by the size and shape of the body portions, as well as the desired amount of movement between said body portions.

Illustratively, in addition to, or in lieu of, the fibrous material forming the visor hinge via high pressure alone, the hinge may also be formed by having a band of material removed at the hinge area. In one illustrative embodiment, a hinge having a band width about ⅛ inch wide and a removal depth of about 70 weight percent of thickness mass allows the hinge full compression thickness after molding of about 0.03125 inch, for example. The convex molding of the hinge may straighten during final folding assembly, providing a straight mid line edge between the two final radiuses. It is contemplated that the mold for the mirror depressions, etc., plus additional surface molding details can be achieved using this process. It is further anticipated that the cover stock may be applied during the molding process where the cover is bonded to the visor by the polypropylene contained in the fibrous material formulation.

Figure 14:
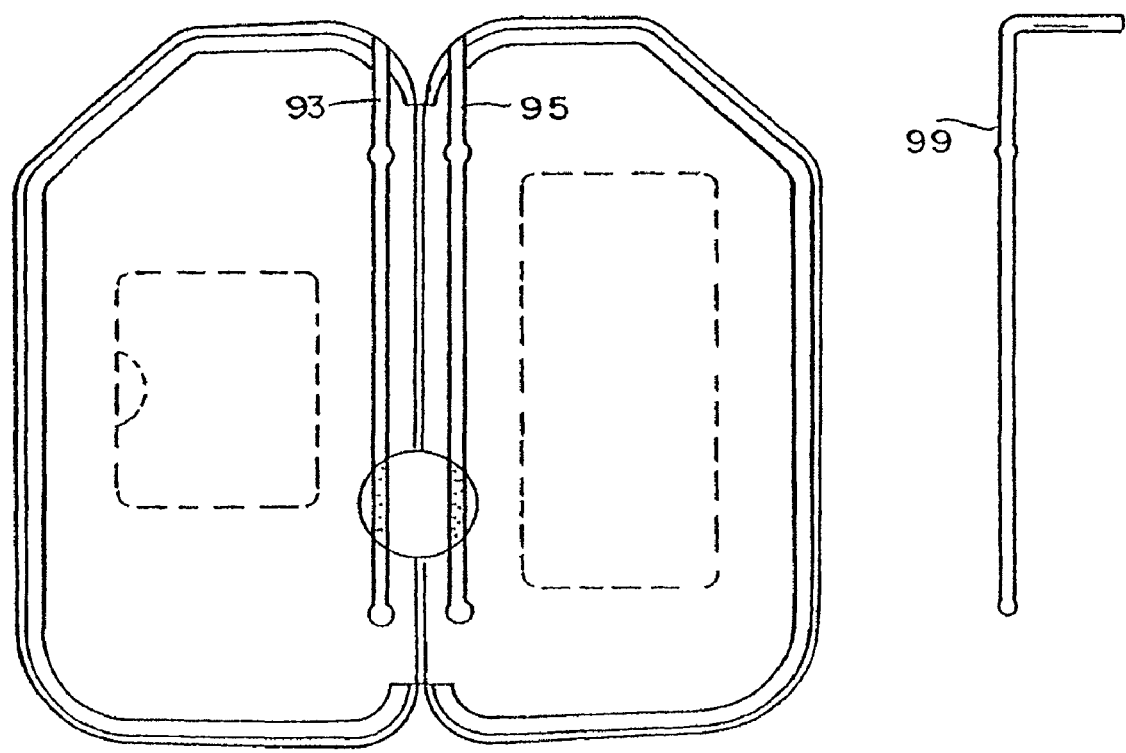
FIG. 14a is a top view of the visor body of FIGS. 11 and 12 in the open position.
FIG. 14b is an illustrative visor attachment rod.

The illustrative embodiment of body 90 includes longitudinally-extending depressions 93, 95 which form a cavity 97. (See FIGS. 11*a*, 12*a* and 14*a*.) Cavity 97 is configured to receive bar 99, as discussed further herein. (See FIG. 14*b*.) It is appreciated that such depressions and cavities described herein with respect to body 90 are for illustrative purposes. It is contemplated that any design requiring such a moldable body and hinge can be accomplished pursuant the present disclosure herein.

As previously discussed, body 90 may be comprised of low density material to allow variable forming geometry in the visor structure, i.e., high and low compression zones for allowing pattern forming. For example, the panels portion may be a low compression zone, whereas the hinge portion is a high compression zone. In addition, the high compression zone may have material removed illustratively by a saw cut during production, if required, as also previously discussed. This allows for a thinner high compression zone which facilitates the ability for the material to be flexed back and forth without fatiguing, useful for such a hinge portion.

Figure 13:
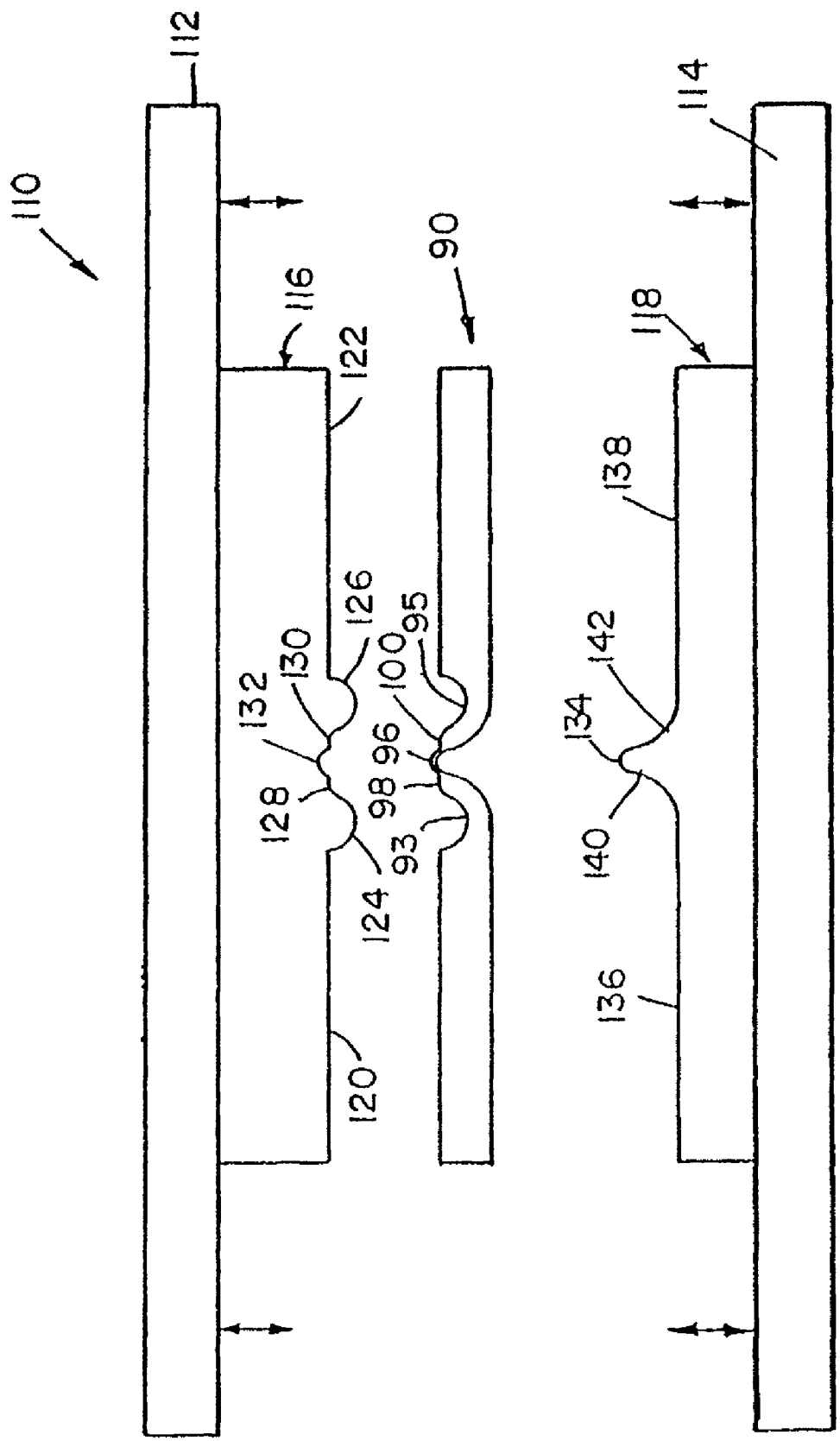
FIG. 13 is an end view of a die assembly to compression mold a fiber material body and hinge.

An end view of a die assembly 110 for compression molding a fiber material body and hinge is shown in FIG. 13. The form of the die assembly 110 shown is of an illustrative shape. It is contemplated that such a body 90 can be formed into any desired shape. In the illustrated embodiment, assembly 110 comprises illustrative press plates 112, 114. Illustratively, dies 116, 118 are attached to plates 112, 114, respectively. Die 116 is formed to mirror corresponding portion of body 90. It is appreciated that because the view of FIG. 13 is an end view, the dies can be longitudinally-extending to any desired length. This illustrative embodiment of die 116 includes surfaces 120, 122 and includes compression zones 124, 126, 128, 130. Zones 124, 126 are illustratively protrusions that help form the depressions 93, 95, respectively, of body 90, as shown. (See also FIG. 11*a*.) Zones 128, 130 are illustratively protrusions that help form the depressions 98, 100, respectively, of body 90, as shown. (See also FIG. 11*a*.) And zone 132 is illustratively a form that, in cooperation with zone 134 of die 118, form hinge portion 96.

This illustrative embodiment of die 118 includes surfaces 136, 138 and includes compression zones 140, 142, 134. Zones 140, 142 are illustratively sloped walls that help form zone 134. (See also FIG. 11*a*.) Zone 134 is illustratively a peak that, in cooperation with zone 132 creates a high compression zone to form hinge portion 96, and, illustratively, depressions 98, 100, if desired. Again, it is appreciated that the present pattern of such zones shown is not the only such pattern contemplated by this disclosure.

In the illustrated embodiment, body 90, in the illustrative form of a hinged visor, is folded as that shown in FIG. 12*a*. It is further contemplated that during forming the body may be heated by hot air to bring it up to forming temperatures. The heating cycle time may be about 32 seconds, and the toll time after clamp for cool down will be around 45 to 50 seconds, depending on tool temperature. Furthermore, skins, like a fabric skin can be bonded to the visor during this step.

Another embodiment of the hardboard panel is a low density panel, illustratively, an approximately 2600 gram panel with about 50 weight percent fiber-like hemp, kenaf, or other fiber material with about 50 weight percent polypropylene. Such materials are subjected to hot air to produce a lightweight, low density panel. The panel material may be needle-punched or have a stretched skin surface applied thereon for use as a tackable panel, wall board, ceiling tile, or interior panel-like structure.

Figure 15:
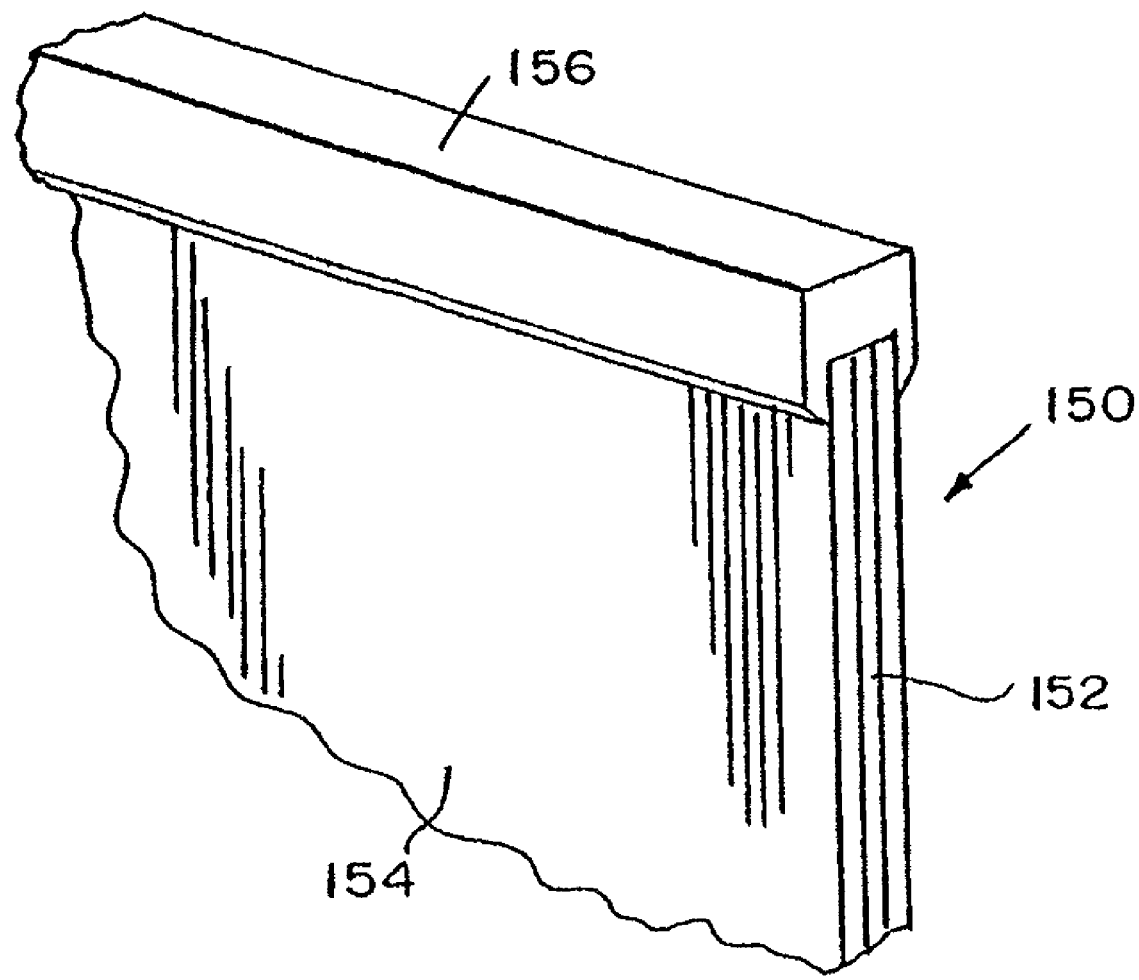
FIG. 15 is a perspective view of a wall panel comprising a laminated panel body.

A portion of a dry-erase board 150 is shown in FIG. 15. Such a board 150 may comprise a hardboard panel 152 (similar to panel 2) pursuant the foregoing description along with a surface coating 154. The surface coating, as that described further herein, provides an optimum work surface as a dry-erase board. Surface coating 154, for example, can be a Class A finish previously described. This illustrative embodiment includes a frame portion 156 to enhance the aesthetics of board 150. One embodiment may comprise a dual-sided board with a low density tack board on one side and a dry-erase hardboard on the other side.

An illustrative embodiment of a work body in the form of a table top 180, is shown in FIG. 16. The view illustrated therein is a partial cut-away view showing the mating of a top 182 to an underside 184. An illustrative pedestal 186 supports table top 180 in a conventional manner. It is appreciated, however, that the table top 180 is shown in an exaggerated view relative to pedestal 186 so as to better illustrate the relevant detail of the table top 180.

In the illustrated embodiment, the periphery 188 of top 182 is arcuately formed to create a work surface edging. The top 182 is attached to the underside 184 via a portion of the periphery 190 of the same mating with the top 182. Periphery 190 illustratively comprises an arcuate edge portion 192 which is complimentarily shaped to the interior surface 194 of periphery 188 of top 182. Adjacent the arcuate edge portion 192 is an illustrative stepped portion 196. Stepped portion 196 provides a notch 198 by extending the underside panel 202 of the underside 184 downward with respect to top 182. Notch 198 provides spacing for edge 200 of periphery 188. Such an arrangement provides an appearance of a generally flush transition between top 182 and underside 184. Interior surface 194 of periphery 188 and outer surface 204 of periphery 190 can be mated and attached via any conventional method. For example, the surfaces can be ionize-charged to relax the polypropylene so that an adhesive can bond the structures. In addition, a moisture-activated adhesive can be used to bond the top 182 with the underside 184.

Detailed views of the mating of top 182 and underside 184 is shown in FIGS. 17 and 18. The conformity between peripheries 188 and 190 are evident from these views. Such allows sufficient bonding between top 182 and underside 184. The generally flush appearance between the transition of top 182 and underside 184 is evident as well through these views. The variations between illustrative embodiments are depicted in FIGS. 17 and 18. For example, top surface 206 is substantially coaxial with level plane 208 in FIG. 17, whereas top surface 206 is angled with respect to level plane 208. It is appreciated, as well, that the disclosure is not intended to be limited to the shapes depicted in the drawings. Rather, other complimentarily-shaped mating surfaces that produce such a transition between such top and bottom panels are contemplated to be within the scope of the invention herein.

Such mating of top 182 and underside 184 may produce a cavity 210, as shown in FIGS. 16 through 19. Depending on the application, cavity 210 may remain empty, or may contain a structure. For example, FIG. 19 shows an end view of table top 180 with a truss member core support 76 illustratively located therein. Truss member core 76 can be of the type previously described and be attached to the interior surfaces 194, 212 via conventional means, such as an adhesive, for example. Such a core structure can provide increased strength to table top 180. In fact, such strength can expand the uses of the work body to other applications in addition to a table top. For example, such can be used as a flooring, or side paneling for a structure or a vehicle. It is contemplated that other such cores can be used in place of the truss member. For example, a foam core or honeycomb core can be used in place of the truss.

Figure 20:
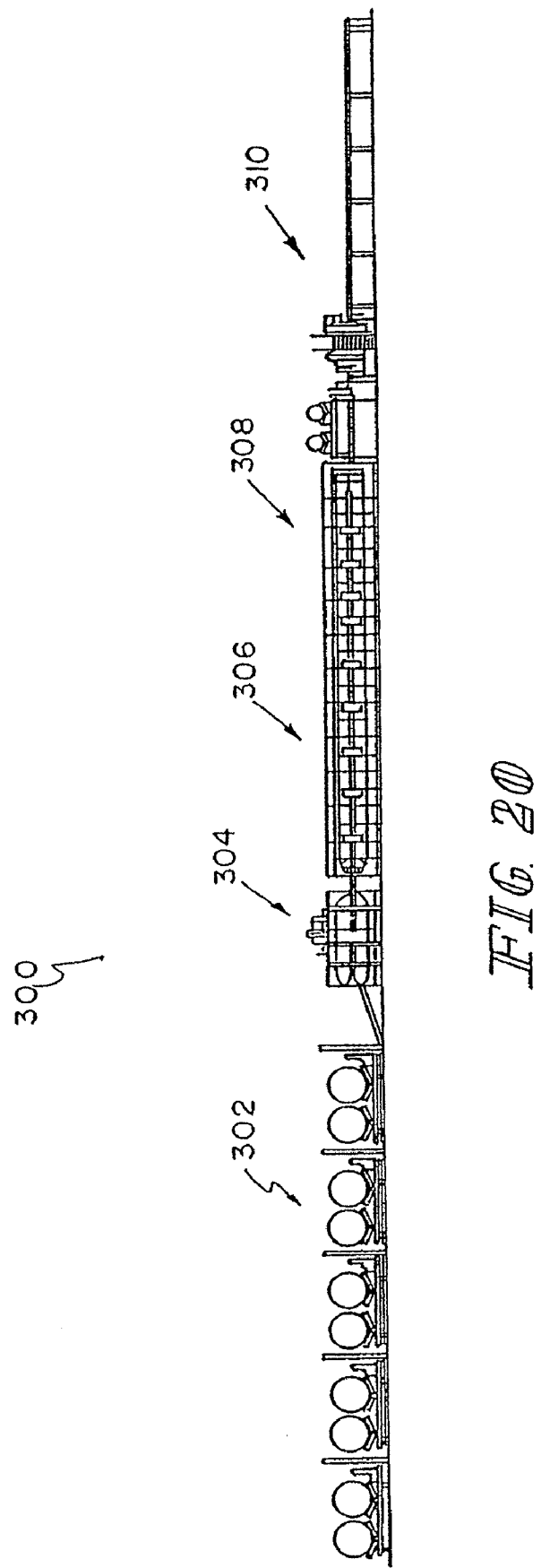
FIG. 20 is a side view of a hardboard manufacturing line.
Figure 21:
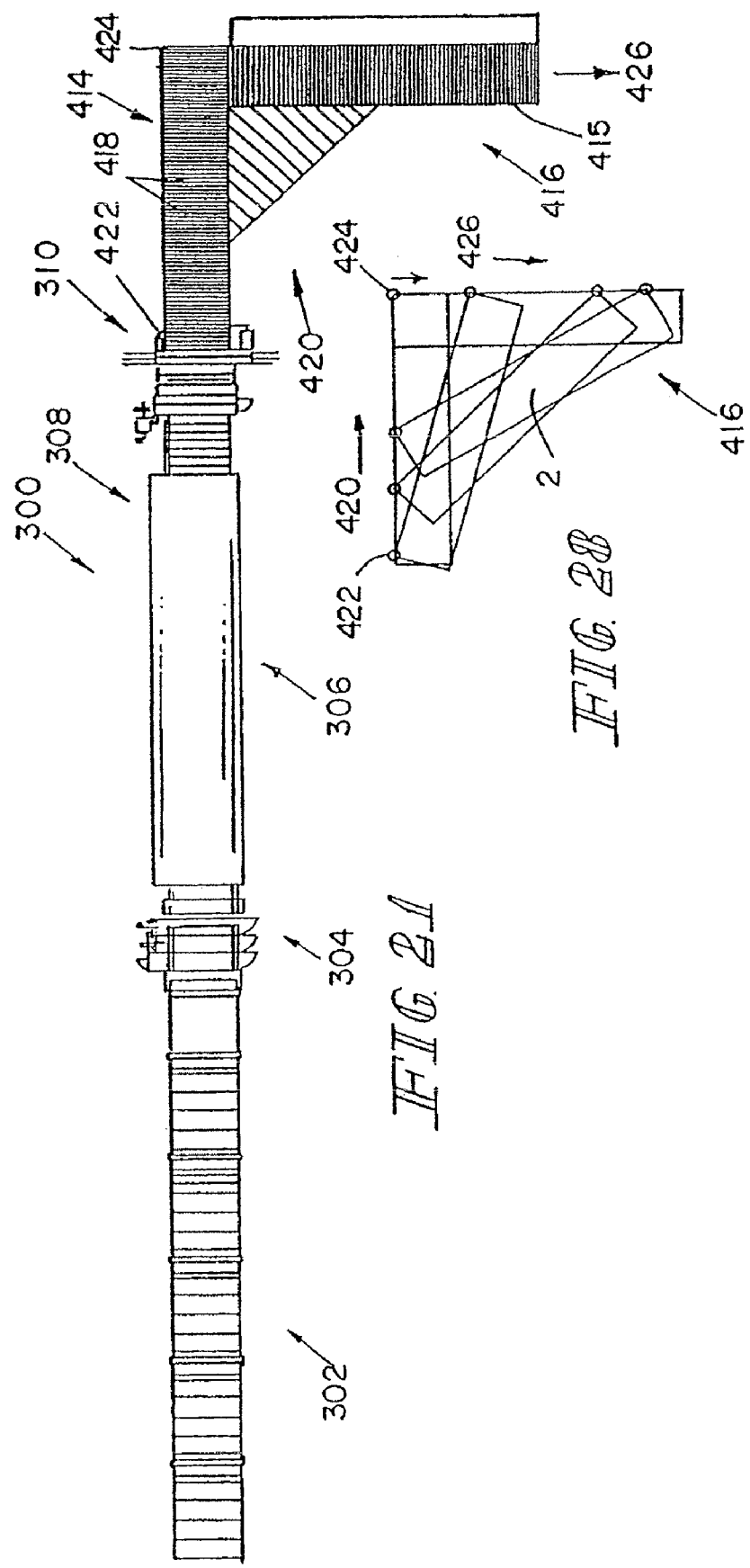
FIG. 21 is a top view of the hardboard manufacturing line of FIG. 20.

An illustrative hardboard manufacturing line 300 is shown in FIGS. 20 through 28. Line 300 is for manufacturing laminated hardboard panels of the type shown in FIGS. 1 through 3, and indicated by reference numeral 2, for example. The manufacturing process comprises the mating of the several layers of materials, illustratively layers 6 and 8 (see FIG. 1), heating and pressing said layers into a single laminated composite panel, cooling the panel, and then trimming same. In the illustrative embodiment, line 300 comprises the following primary stages: uncoiling and mating 302 (FIG. 22), pre-heating 304 (FIG. 23), heat and press 306 (FIG. 24), cooling 308 (also FIG. 24), laminating station (FIGS. 25 through 28), and shear and trim 310 (also FIGS. 25 through 28.) A top view of line 300 is shown in FIG. 21. It is appreciated that the line 300 may be of a width that corresponds to a desired width of the composite material. FIG. 21 also illustrates the tandem arrangement of each of the stages 302, 304, 306, 308, 310.

Figure 22:
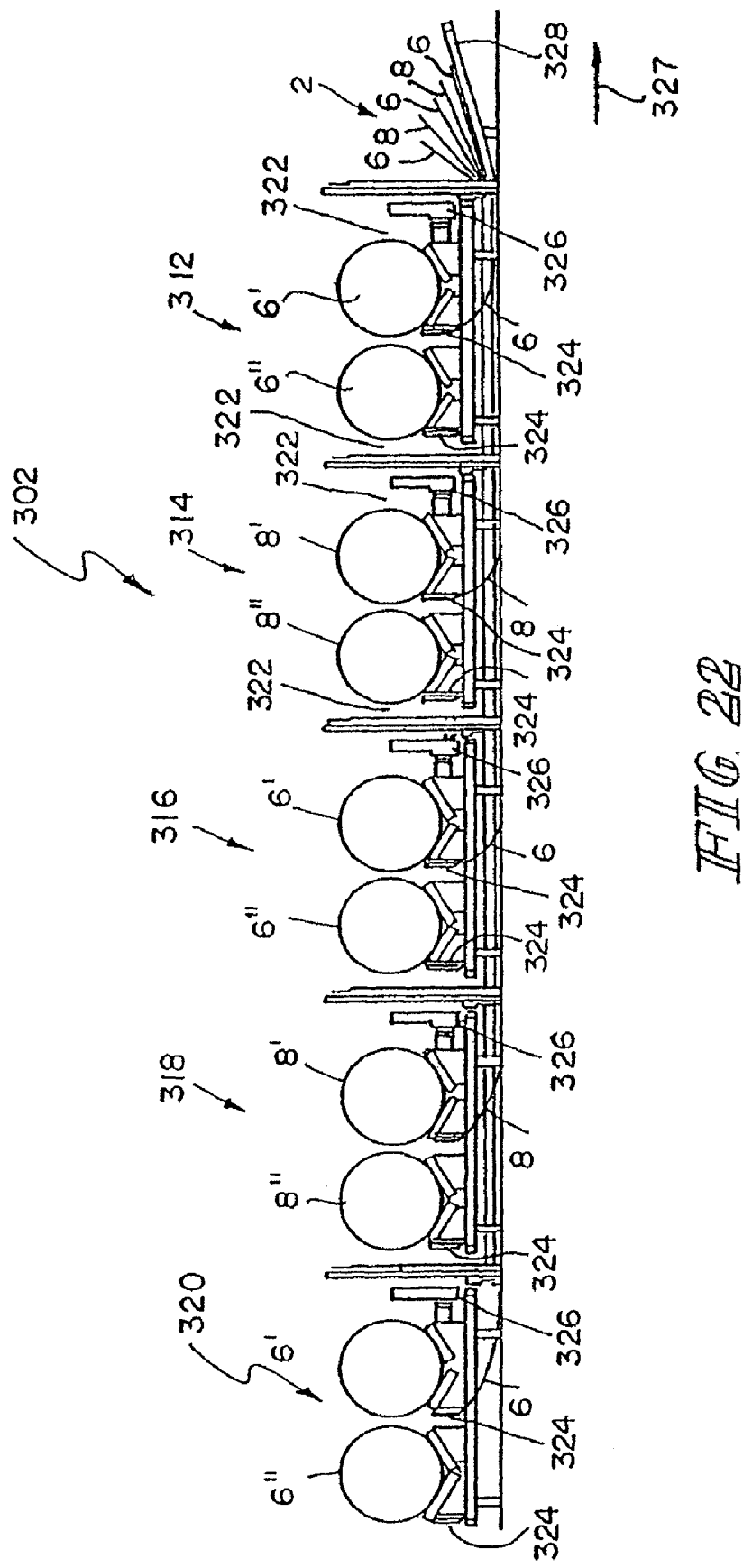
FIG. 22 is a side view of the uncoiling and mating stages of the hardboard manufacturing line of FIG. 20.

The uncoiling and mating stage 302 is shown in FIG. 22. In the illustrative embodiment, the materials used for forming the composite are provided in rolls. It is appreciated that the materials may be supplied in another manner, but for purposes of the illustrated embodiment, the material will be depicted as rolls. Illustratively, stage 302 holds rolls of each illustrative layer 6 and 8 in preparation for mating. As illustrated, stage 302 comprises a plurality of troughs 312 through 320, each of which being illustratively capable of holding two rolls, a primary roll and a back-up roll, for example. In one embodiment, it is contemplated that any number of troughs can be used, and such number may be dependent on the number of layers used in the laminated body.

For this illustrative embodiment, line 300 is configured to manufacture a laminated composite panel 2 similar to that shown in FIGS. 1 through 3. It is appreciated, however, that the utility of line 302 is not limited to making only that panel. Rather, such a line is also capable of manufacturing any laminated panel that requires at least one of the stages as described further herein. Troughs 312, 316, and 320 each comprise a primary roll 6' and a back-up roll 6" of layer 6. In this example, layer 6 is illustratively a non-oriented fibrous material. Similarly, troughs 314 and 318 each comprise a primary roll 8' and a back-up roll 8" of layer 8 which is illustratively the woven fiber layer. Each roll rests on a platform system 322 which comprises a sensor 324 and a stitching device 326. Sensor 324 detects the end of one roll to initiate the feed of the back-up roll. This allows the rolls to create one large continuous sheet. For example, once fibrous material primary roll 6' is completely consumed by line 302, and sensor 324 detects the end of that primary roll 6' and causes the beginning of back-up roll 6" to join the end of primary roll 6'. This same process works with primary roll 8' and back-up roll 8" as well.

To secure each roll of a particular material together, stitching device 326 stitches, for example, the end of primary rolls 6' or 8' with the beginning of the back-up rolls 6" or 8", respectively. The stitched rolls produce a secure bond between primary rolls 6', 8' and back-up rolls 6" and 8", respectively, thereby forming the single continuous roll. Illustratively, stitching device 326 trims and loop stitches the ends of the materials to form the continuous sheet. Also, illustratively, the thread used to stitch the rolls together is made from polypropylene or other similar material that can partially melt during the heating stages, thereby creating a high joint bond in the final panel. It is contemplated, however, any suitable threads can be used which may or may not be of a polymer.

Each trough of stage 302 is configured such that, as the material is drawn from the rolls, each will form one of the layers of the laminated composite which ultimately becomes the hardboard panel. Fibrous material layer 6 of primary roll 6' from trough 312 illustratively forms the top layer with the material from each successive trough 314 through 320, providing alternating layers of layers 6 and 8 layering underneath, as shown exiting at 321 in FIG. 22. Each roll of material is illustratively drawn underneath the troughs exiting in direction 327. The resulting layered materials exit stage 302 at 321, pass over bridge 328, and enter the pre-heating stage 304.

Figure 23:
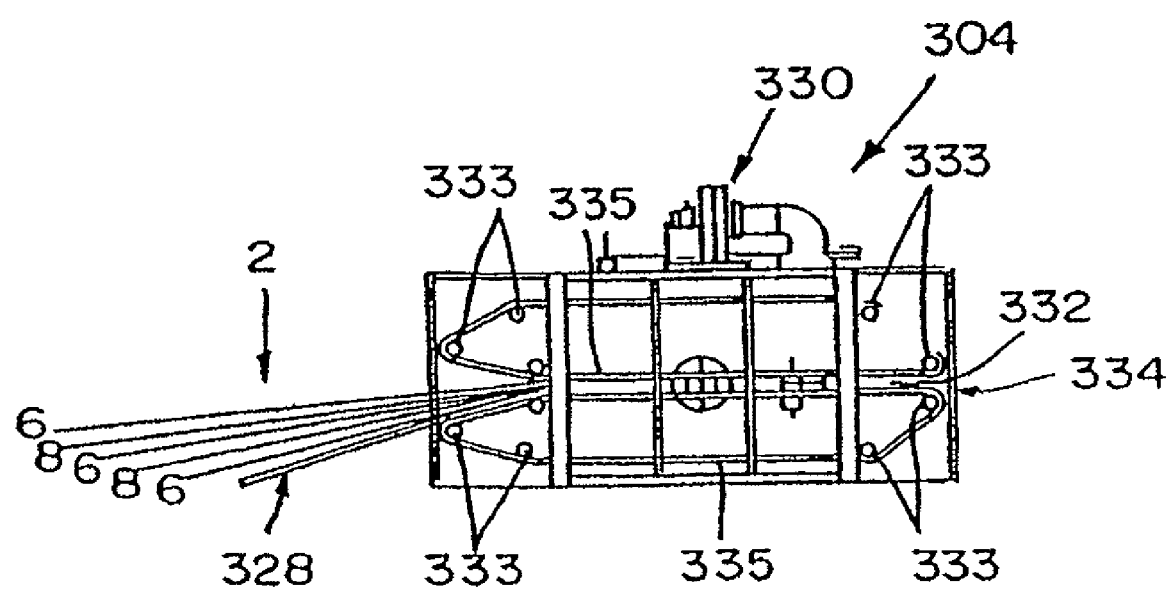
FIG. 23 is a side view of the pre-heating stage of the hardboard manufacturing line of FIG. 20.

Pre-heat stage 304, as shown in FIG. 23, comprises an oven 323 which forces hot air at approximately 240 degrees F. into the composite layers. Oven 323 comprises a heater-blower 330 which directs heated air into composite chamber 332 which receives the material layers. This hot air removes moisture from layers 6, 8, as well as heats the center-most layers of the same. Because often such materials are hydrophobic, the removal of the moisture causes the center of the materials to cool. The forced heat causes the center to be warmed, even while the moisture is being removed.

This pre-heat allows the process to become more efficient during the heat and press stage 306. Stage 308 illustratively comprise a roller/belt system which includes rollers 333 that move belts 335, as shown in FIG. 23. Illustratively, these belts are located above and below the panel 2, defining at least a portion of chamber 332. Belts 335 assist in urging panel 2 through stage 304 and on to stage 306.

Figure 24:
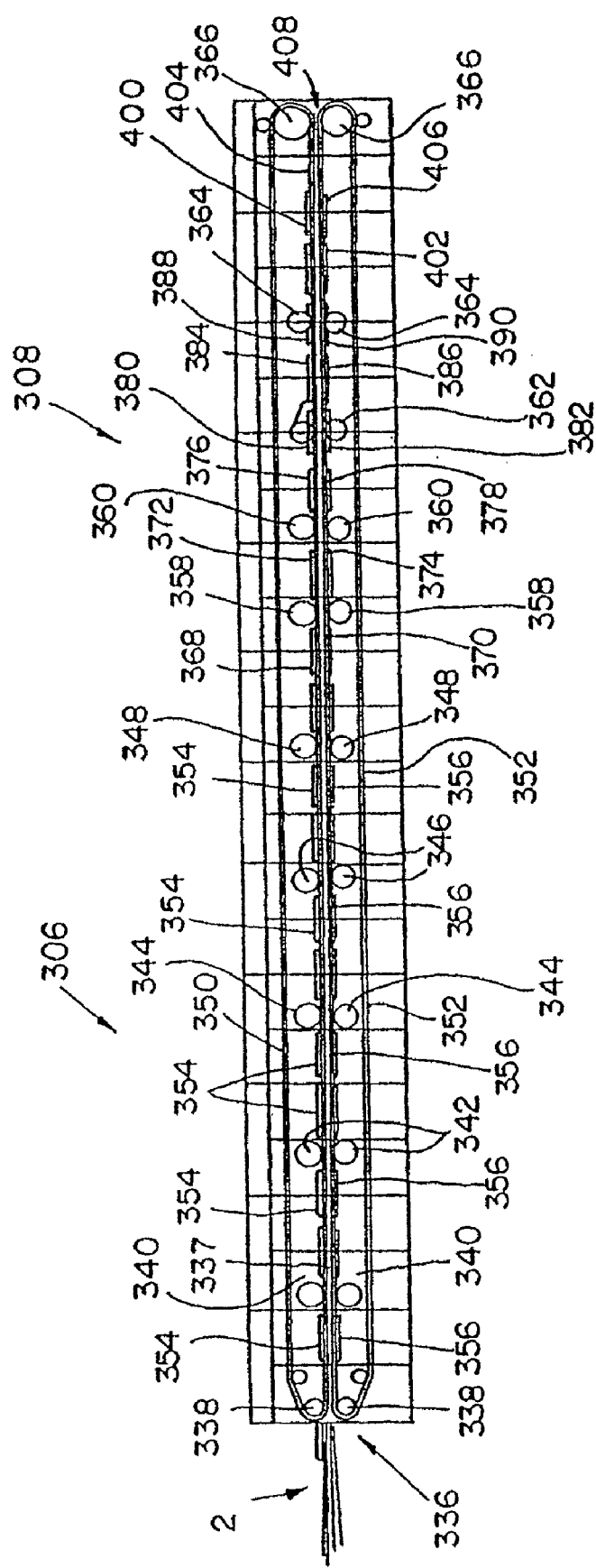
FIG. 24 is a side view of the heat, press and cooling stages of the hardboard manufacturing line of FIG. 20.

The preheated composite layers exit through opening 334 of stage 304 and enter the heat and press stage 306, as shown in FIG. 24. The pre-heated composite panel 2 enters stage 306 through opening 336 and into chamber 337. The heat and press stage 306, uses a progression of increasingly narrowly-spaced rollers located between heat zones, thereby reducing the vertical spacing in chamber 337. The combination of the heat and the narrowing rollers reduces the thickness of panel 2 transforming same into a laminated composite panel 2 of desired thickness. For example, stage 306 comprises pairs of spaced rollers 338, 340, 342, 344, 346, 348 through which the composite layers pass. The rollers are linearly spaced apart as shown in FIG. 24. In one illustrative embodiment, to make a 4 millimeter panel, rollers 338 will initially be spaced apart about 15 millimeters. Successively, rollers 340 will be spaced apart about 12 millimeters, rollers 342 will be spaced apart about 9 millimeters, rollers 344 will be space apart about 6 millimeters, and finally, rollers 346 and 348 will be each spaced apart about 4 millimeters. This gradual progression of pressure reduces stress on the rollers, as well as the belts 350, 352 driving the rollers. Such belts 350, 352 generally define the top and bottom of chamber 337 through which panel 2 travels. Because of the less stress that is applied to belts 350 and 352 which drive rollers 338, 340, 342, 344, 346, 348, such belts 350, 352 can be made from such materials as Teflon glass, rather than conventional materials such as a metal. The Teflon belts absorb less heat than metal belts do, so more of the heat generated will be transferred to the to the lamination of panel 2, in contrast to production lines using conventional metal belts. In one illustrative embodiment, stages 306 and 308 are approximately 10 meters long and approximately 4 meters wide.

In one illustrative embodiment, located between every two pairs of rollers are a pair of surfaces or platens 354, 356 between which the panel 2 moves during the lamination process. Illustratively, platens 354, 356 receive hot oil or similar fluid. It is appreciated, however, that other methods of heating the platens can be used. In the present embodiment, however, the hot oil causes the platens 354, 356 to raise the core temperature of the panel 2 to about 340 degrees F. The combination of the compression force generated by the rollers 338, 340, 342, 344, 346, 348 and the heat generated by the platens 354, 356 causes the polypropylene in the material layers 6, 8 to melt, causing same to begin fusing and compacting into the panel 2 of desired thickness.

After the layers 6, 8 of the composite panel 2 is heated, fused, and reduced to a desired thickness, the resulting composite panel 2 is cooled at cooling stage 308. In the illustrated embodiment, cooling stage 308 is an extension of the heat and press stage 306 to the extent that stage 308 also includes pairs of rollers 358, 360, 362, 364, 366 which are similarly situated to, and arranged linearly with, rollers 338, 340, 342, 344, 346, 348. The space between each of the rollers is about the same as the space between the last pair of rollers of the heat and press stage 306, in this case rollers 348. In the forgoing example, the rollers 348 were illustratively spaced apart about 4 millimeters. Accordingly, the spacing between the rollers of each pair of rollers 358, 360, 362, 364, 366 of stage 308, through which the panel passes, is also spaced apart about 4 millimeters. Cooling stage 308 treats platens 372 through 406 that are cooled with cold water, illustratively at approximately 52 degrees F., rather than being treated with hot oil, as is the case with heat and press stage 306. This cooling stage rapidly solidifies the melted polypropylene, thereby producing a rigid laminated hardboard panel 2.

Hardboard panel 2 exits the cooling stage 308 at exit 408, as shown in FIG. 24, and enters the shear and trim stage 310, as shown in FIGS. 25 through 28. In one illustrative embodiment, composite panel 2 passes through an interior wall laminating stage 410 and into the trim and cutting stage 412. When panel 2 passes through stage 412, its edges can be trimmed to a desired width and the panel cut to any desired length with the panel exiting to platform 414.

A top view of line 300 is shown in FIG. 21 which includes the various aforementioned stages 302, 304, 306, 308, 310 as well as finishing a stage 416. This stage 416 is illustratively for applying an acrylic or other like resin finish to the surface of the composite panel. Specifically, once such a composite panel 2 exits the shear and trim stage 310, it is supported on a plurality of rollers 418 and placed along the length of platform 414 to move panel 2 in direction 420. In one illustrative embodiment, panel 2 may be rotated into position, as shown in FIG. 28, to finishing stage 416. To rotate panel 2, movable catches 422, 424, one at the proximal end of platform 414 and the other at the distal end of platform 414, as shown in FIGS. 21 and 28, both move concurrently to move panel 2. Catch 422 moves a corner of panel 2 in direction 420 while catch 424 moves the other corner of panel 2 in direction 426, ultimately positioning panel 2 on platform 415 at stage 416. It is appreciated, however, that it is not required to locate such a finishing stage at an angle relative to line 300. Alternatively, stage 416 may be located linearly with the remainder of line 300.

Illustratively, before applying the acrylic finish to panel 2 at stage 416, its surface is first prepared. The illustrative process for preparing the surface of panel 2 is first sanding the surface to accept the finish coat. After sanding the surface of panel 2, a wet coating of the resin is applied. Illustratively, the resin is polyurethane. The acrylic resin can then be UV cured, if necessary. Such curing is contemplated to take as much as 24 hours, if necessary. Initial cooling, however, can take only three seconds. Such an acrylic coating has several uses, one is the dry-erase board surface, previously discussed, as well as exterior side wall panels for recreational vehicles and pull type trailers. It is further contemplated herein that other surface coatings can be applied at stage 416 as known by those skilled in the art.

Figure 25:
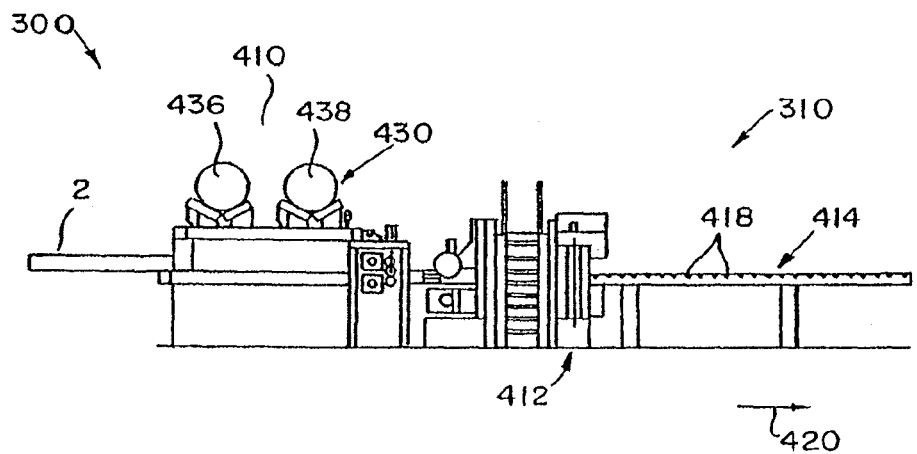
FIG. 25 is a side view of a laminating station and shear and trim stages as well as a finishing stage of the hardboard manufacturing line of FIG. 20.
Figure 26:
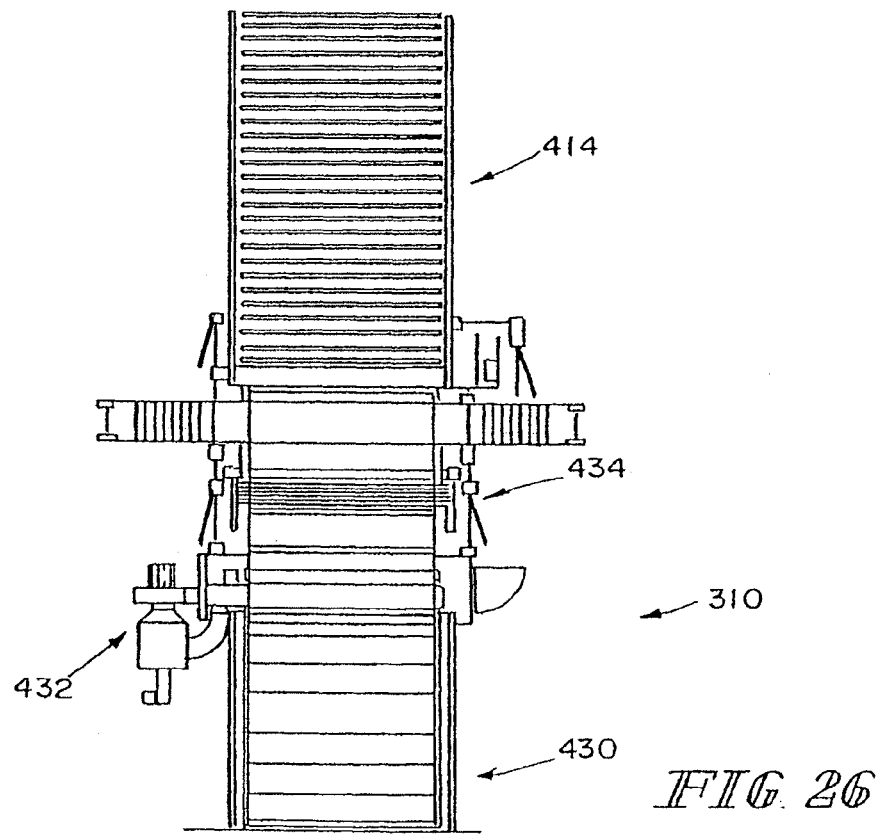
FIG. 26 is a top view of the laminating station and shear and trim stages as well as the finishing stage of the hardboard manufacturing line of FIG. 20.

In another illustrative embodiment, interior wall laminating stage 410, though part of line 300, can be used to create wall panel composites from panel 2. When making such panel, rather than panel 2 passing through stage 410, as previously discussed panel 2 is laminated at stage 410. In this illustrative embodiment, as shown in FIGS. 25 and 26, for example, stage 412 comprises an uncoiling hopper 430, a hot air blower 432, and a roller stage 434. Hopper 430 is configured to support illustratively two rolls of material. For this illustrative embodiment, a base substrate layer 436, and a finish surface material layer 438 is located in hopper 430. It is appreciated that the base substrate layer 436 can be any suitable material, including the fibrous material layer 6 as previously discussed or a priming surface material. The finish surface material layer 438 can be of any finishing or surface material such as vinyl, paper, acrylic, or fabric. Uncoiling hopper 430 operates similar to that of stage 302 to the extent that they both uncoil rolls of material. Hopper 430 operates differently from stage 302, however, to the extent that both layers 436 and 438 uncoil concurrently, rather than in tandem, like rolls 6' and 6", for example. In other words, both layers 436, 438 will form the layers of the composite top coat, rather than form a single continuous layer for a board, as is the case with roll 6' and 6".

Figure 27:
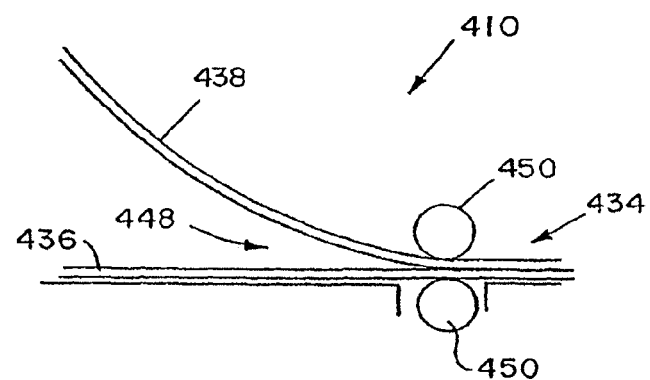
FIG. 27 is a side view of a portion of the laminating station stage of the hardboard manufacturing line of FIG. 20.

In the illustrative embodiment, base substrate layer 436 uncoils below the finish surface material layer 438, as shown in FIGS. 26 and 27. In addition, both layer 436 and layer 438 form a composite as they enter roller stage 434. The hot air blower 432 blows hot air 448 at approximately 450 degrees F. in direction 448 between layer 436 and layer 438. This causes the surfaces, particularly the base material layer 436 surface, to melt. For example, if the base substrate layer 436 is fibrous material layer 6, the polypropylene on the surface of this material melts. As layer 436 and layer 438 pass between a pair of rollers 450 at the roller stage 434, the melted polypropylene of layer 436 bonds with the layer 438, forming a composite of fibrous material having the finish surface material 438. After the materials have formed a laminated composite, they can then proceed to the shear and trim stage 310.

It is contemplated that finish surface material layer 438 may comprise several finish materials applied to base material layer 436 either concurrently or in tandem. For example, a roll of material layer 438 may comprise a roll that includes a section of vinyl, attached to a section of paper, and then fabric, and then vinyl again. Uncoiling this roll and bonding it to layer 436 produces a single composite board having several tandemly positioned finish surfaces that can be sheared and cut at stage 310 as desired.

Figure 30:
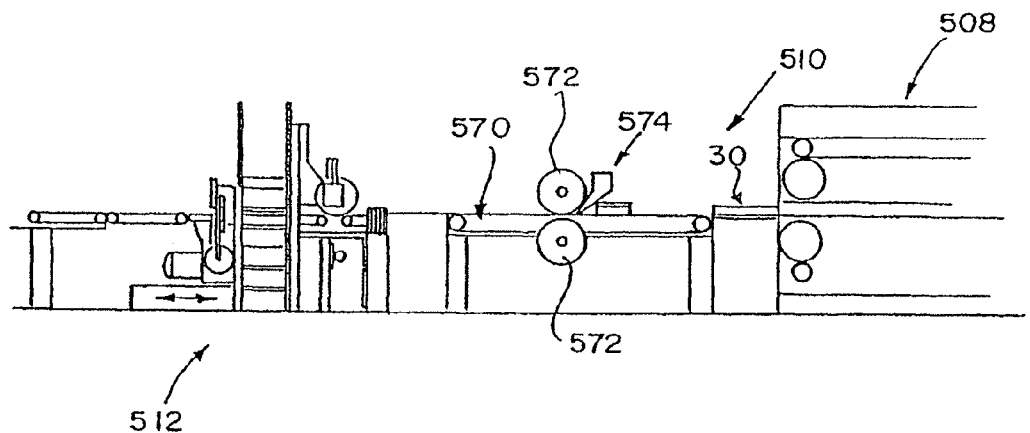
FIG. 30 is a side view of the calendaring stage of the hardboard manufacturing line of FIG. 29.
Figure 29:
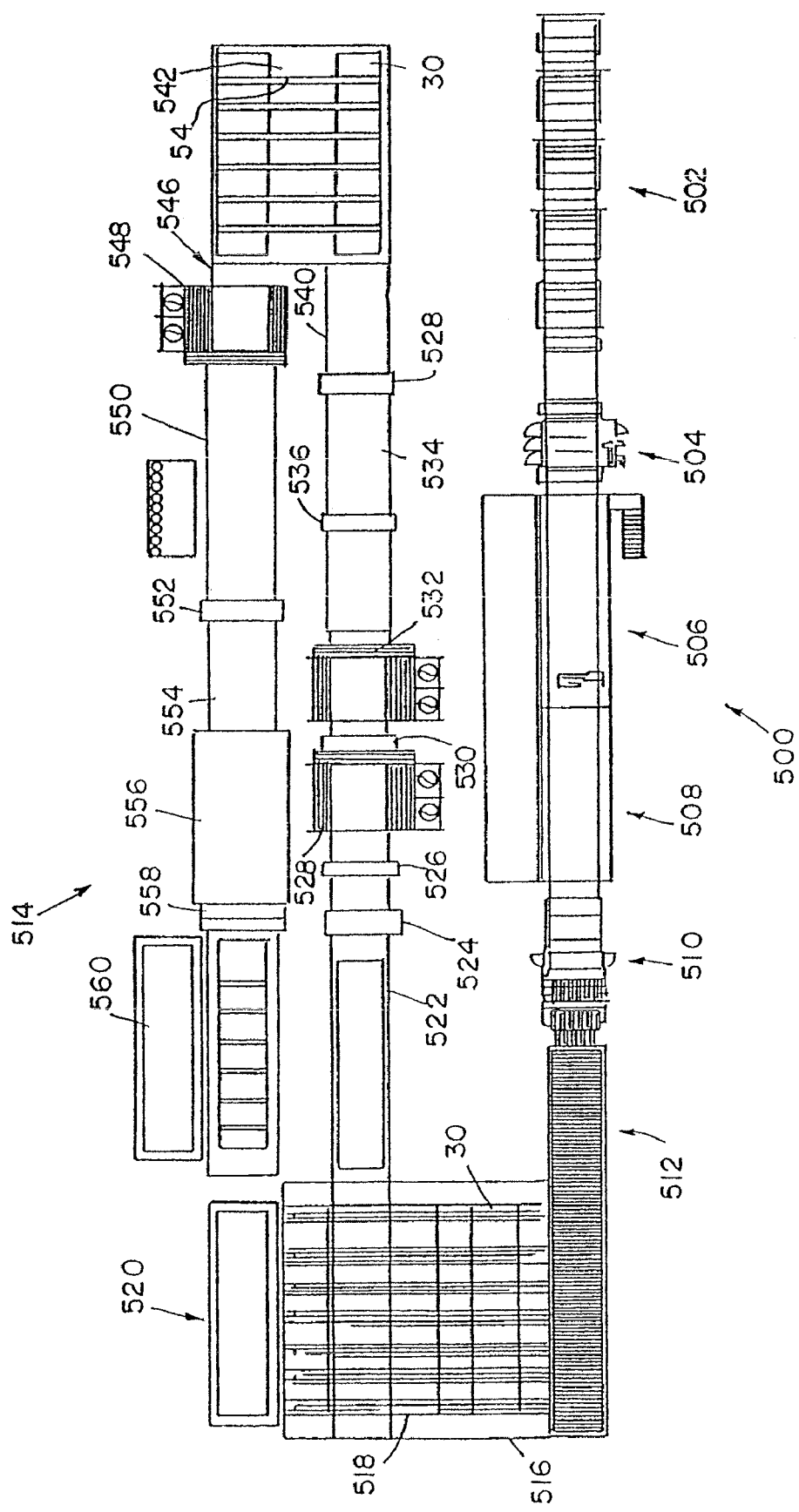
FIG. 29 is a top view of another embodiment of a laminated hardboard manufacturing line.

Another illustrative hardboard manufacturing line 500 is shown in FIGS. 29 and 30. Line 500 is another embodiment for manufacturing laminated hardboard panels of the type illustratively shown in FIGS. 4 through 6. This manufacturing line 500 is similar to manufacturing line 300 previously discussed, wherein process 500 comprises the mating of several layers of materials, illustratively layers 22, 24, as well as the calendaring surface 32 and coated surface 34, as shown illustratively in panel 30 of FIG. 6. Manufacturing line 500 comprises the following panel manufacturing stages: the uncoiling and mating stages 502, the pre-heating stage 504, the heat and press stage 506, the cooling stage 508, the calendaring stage 510, and the shear and trim stage 512.

One illustrative embodiment of line 500 comprises a calendaring stage 510. This stage is located in the same location as the laminating stage 410 of line 300, as shown in FIG. 25. The purpose of the calendaring stage is to smooth the top surface of the illustrative panel 30 to prepare it for the paint application of line 514. Conventionally, using belts 350, 352 in conjunction with the heated platens may cause the texture of those belts, similar to a cloth pattern, to be embedded in the surfaces of the panel 30. (See, also, FIG. 24.) The calendaring process removes this pattern to provide a smoother surface in anticipation of the paint application. In the illustrated embodiment shown in FIG. 30, calendaring stage 510 comprises a conveying line 570 and spaced apart rollers 572, as well as a heat source 574. As panel 30 exits the cooling stage 508, it is transferred to the calendaring stage 510 where the heat source, illustratively infrared heat or heated air, or a combination of both, is applied to the surface of the panel 30. Panel 30 is then directed between the two spaced apart rollers 572 which will then smooth the surface that has been heated by heater 574. In one embodiment, it is contemplated that at least one of the rollers is temperature controlled, illustratively with water, to maintain the rollers up to an approximate 120 degrees F. It is further contemplated that the heated air or IR heater is controlled to only heat the surface of panel 30 and not the center of the board itself. Furthermore, it is contemplated that the roller can subject up to an approximate 270 pounds per linear inch force on the surface of the panel 30 in order to smooth out any pattern in the surface and/or related defects thereon to produce a calendared surface 32 as previously discussed with respect to FIG. 6. It will be appreciated that this calendaring process will prepare the surface 32 of panel 30 so that it may receive a Class A auto finish. Once the panel 30 exits the calendaring stage 510, it then is transferred to the shear and trim stage 512 where the panel will take its final shape prior to the paint stage.

In contrast to manufacturing line 300, however, line 500 further comprises paint application line 514. Paint line 514 comprises a transfer conveyer 516 which moves panels, in this illustrative case panel 30, from the shear and trim stage 512 to the paint line 514. This is accomplished illustratively by rollers on conveyer 518 moving panel 30 perpendicularly from shear and trim stage 512 to paint line 514 which is illustratively positioned parallel to line 500. If, for example, panel 30 or the other panels 20 and 28 do not receive a paint application, they can be removed from the line at an off-load point 520. If panel 30, for example, will be receiving a paint application, it is loaded onto paint line 514 via a staging section 522 as shown in FIG. 29. The first stage of the paint process of paint line 514 is to flame treat the top surface of panel 30 at 524. The flame treatment process is a means to relax the surface tension and ionize-charge the board for chemical bonding. This will decrease the surface tension of the plastic or the bonding material. Such decrease in surface tension allows the plastic to have a similar surface tension to that of the paint that will create better adhesion of the paint to the board. In the illustrative embodiment, the flame treatment uses a blue flame approximately ¼ inch in height, and the board is passed below the flame of about ⅜ of an inch at a rate of about 26 feet per minute. It is appreciated, however, that other means of heating the surface of panel 30 is contemplated and, in regards to the flame size, temperature, and the distance of the board from the flame, is illustrative and not considered to be the sole embodiment of this disclosure.

It is contemplated that much of the paint line will be enclosed and, because of such, after the flame treatment stage 524, an air input section is added to create positive pressure within the line. In the illustrative embodiment, a fan is added to this section to input air which will blow dust and debris away from the panel to keep it clean. The next stage of paint line 514 is the adhesion promoter spray booth 528. Booth 528 applies a plastic primer to the surface of panel 30 that integrates with the plastic in the board to assist in better adhesion of subsequent paint layers. In this illustrative embodiment, a down-draft spray of the primer is applied to the surface of panel 30. Exiting booth 528, another air input section 530 is illustratively located to further create positive pressure to continue preventing dust or other contaminates from resting on the surface of the panel.

After panel 30 exits the adhesion promoter booth 528, it enters the UV primer seal spray booth 532. Booth 532 applies a UV filler paint to further level the surface of the panel 30, as well as serve as an additional primer for the final UV care paint. It is appreciated, however, that depending on the application of the panel, the UV filler can be replaced with a UV paint or other paint as a topcoat. In this illustrative embodiment, however, the booth 532 uses a down-draft spray to apply the primer seal onto panel 30.

Exiting booth 528, panel 30 then enters an ambient flash stage 534 wherein the panel 30 rests to allow solvents from the paint to evaporate. Though not shown, the solvents are drawn from the ambient flash stage 534 where the solvents are burned so as to not enter the atmosphere. In addition, stage 534 may include an input fan 536, similar to air inputs 526 and 530, to maintain positive pressure in this section.

After allowing the solvents to dissipate from the surface of the panel 30, it is transported under a UV cure lamp 538 to further cure the paint. The UV cure 538 is illustratively a high-intensity, ultra-violet light to which the paint is sensitive, and which will further cure the paint.

After passing through UV cure 538, the panel 30 is passed through an infrared oven 540. The panel 30 is moved through oven 540 at an illustrative rate of 2.5 meters per minute and the IR oven is set at about 165 degrees F. This step further assists to drive out any remaining solvents that might not have been driven out prior to the UV cure. In addition, those solvents are also then sent off and burned before reaching the atmosphere.

Once exiting the IR oven 540, panel 30 is transferred to a side transfer section 542 which allows either removal of panel 30 if the paint applied at booth 532 was the final application of paint, or through conveyors 544 as shown in FIG. 29, if panel 30 is to be transferred to a secondary paint line 546.

If panel 30 is transferred to secondary paint line 546, it is passed through another spray booth 548. Booth 548 uses a down-draft spray to apply a UV topcoat over top the UV filler and adhesion promoter coats previously discussed. The UV topcoat will be the finished coat that provides the Class A auto finish as previously discussed, for example. Once the topcoat has been applied onto the surface of panel 30, the following process is similar to that as described with respect to paint line 514 which is that the panel 30 is again subjected to an ambient flash at section 550, similar to ambient flash stage 534 previously discussed, wherein the solvents are allowed to evaporate, and are driven off and burned. Furthermore, the panel is transferred through a UV cure 552 section, similar to that of 538 and as previously discussed, the UV cure 552 serves also as UV high-intensity light to further cure the topcoat applied at 548. After passing through the UV section 552, panel 30 then enters infrared oven 554, which is similar to IR oven 540 previously discussed, wherein the panel is subjected to a temperature of about 165 degrees F. for about 2.5 minutes.

When panel 30 exits the IR oven, it enters an inspection booth 556 where the surface is inspected for defects in the paint or in the board. The inspection can be either manually accomplished by visual inspection of the surface and identifying such defects, or can be accomplished through an automated inspection process comprising sensors to locate defects, etc. In addition, the inspection booth 556 also serves as a cool-down process for the process. The inspection booth 556 maintains a temperature of about 78 degrees F. with about 50 weight percent relative humidity to cool down at least the surface of the board from the approximate 165 degrees F. from the IR oven to about 80 degrees F. If a board does not pass inspection, it will be removed for repair or recycling. If the board does pass inspection, it will pass through a pinch roller 558 that will apply a slip sheet which is illustratively a thin 4 millimeter polypropylene sheet that protects the painted surface of panel 30 and allow the same to be stacked at the off-load section 560.

Composite materials, like those used to manufacture automobile bodies and interiors, have the potential to be recycled into new materials. An impediment to such recycling, however, is incompatible particle sizes of otherwise potentially recyclable constituents. For example, a variety of combinations of polypropylene, vinyl, polyester, ABS, and fibrous materials may be used to produce a panel or core product for a panel.

Figure 31:
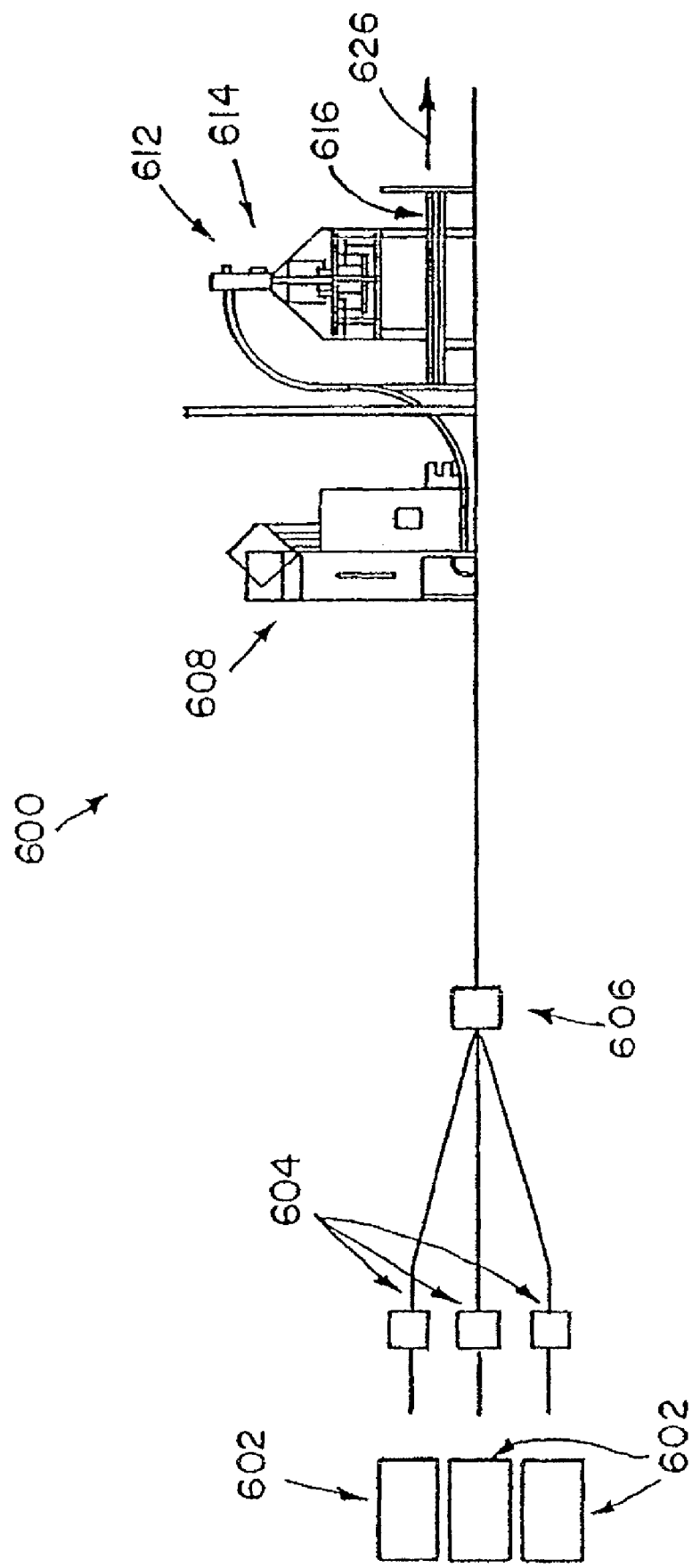
FIG. 31 is a diagrammatic and side view of a portion of a materials recycling system.
Figure 32:
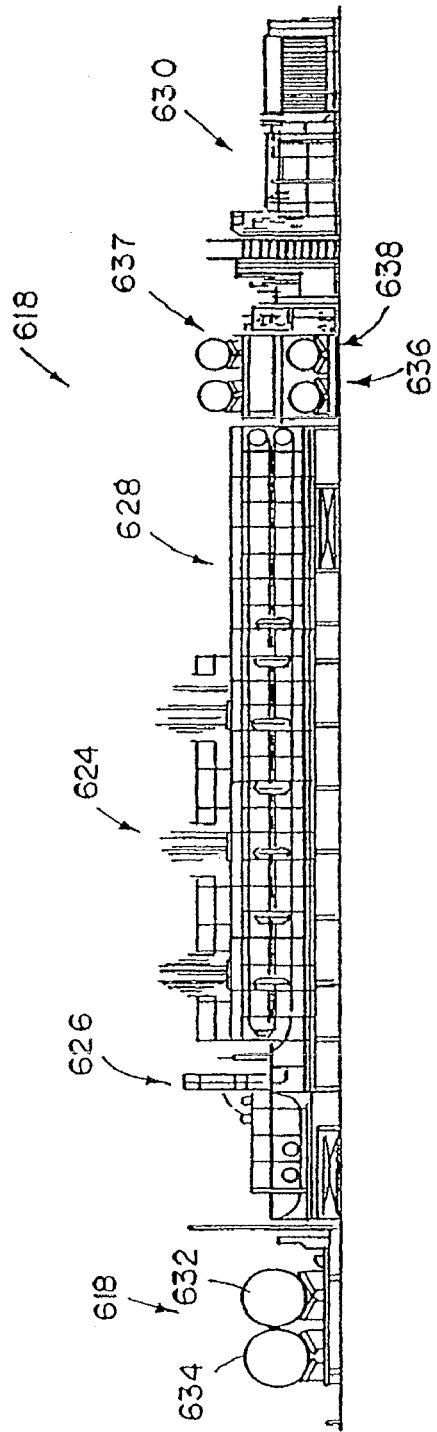
FIG. 32 is a side view of a materials recycling system and laminated hardboard manufacturing line.
Figure 33:
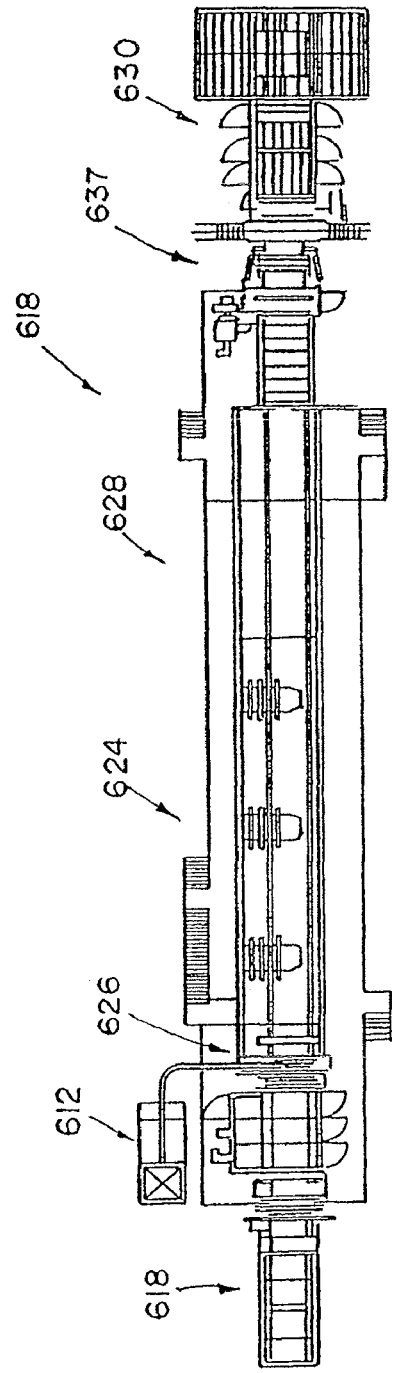
FIG. 33 is a top view of the materials recycling system and laminated hardboard manufacturing line of FIGS. 31 and 32.

In the recycle system 600, shown in FIGS. 31 through 33, several materials are collected and segregated based on a desired composition at 602. Each material is granulated to reduce its particle size. The degree to which each material is granulated can be varied depending on the chemistry desired in the resulting panel. After each material is granulated, the loss and weight is determined at 604. This is done so that the cross-section and weight can be controlled before the resultant material is laminated into a panel. The materials are blended into a composition at 606 and transferred to collector 608. The composition is then transferred from collector 608 through a metal detector 612 which is configured to remove metal particles. The remaining composition is then deposited into a scatter box 614. Scatter box 614 allows particles of a particular maximum size to deposit onto granulate belt 616. The loss and weight of the resulting composition is then determined again to maintain the density of the final panel. The composition is then transferred to the recycle composition storage 626 in anticipation for deposit with the other laminate constituents.

The recycled composition manufacturing panel line 618, shown in FIGS. 32 and 33, is similar to line 300 shown in FIG. 20. Line 618 comprises the following primary stages: uncoiling 620, pre-heater 622, heat and pressure 624, recycled material storage 626, cooling 628, shear and trim 630. In the illustrated embodiment of FIG. 32, rolls 632, 634 of material, such as a fibrous or woven glass material, for example, are located at stage 620. Rolls 632, 634 are uncoiled to form composite layers. These layers are then pre-warmed using pre-heater stage 622, similar to stage 304 used in manufacturing line 300. The recycled composition material from stage 626 exists in the form of chips having an irregular shape with a maximum dimension in any one direction of, illustratively, 0.125 inches, and is then deposited between the composite layers. The new composite layers are then subjected to the same heat, pressure, and cooling at stages 624 and 628, respectively, as to the heat and press stage 306 and the cooling stage 308 of manufacturing line 300.

The heat and pressure stage 624 receives the preheated composite layers, and through a progression of increasingly narrowly-spaced rollers, compresses the composite layers to a desired thickness similar to that previously discussed. Again, this gradual progression of pressure reduces stress on the rollers and the belts driving the rollers, as discussed with stage 306 of line 300. In addition, the belts that drive the rollers can, too, be made of Teflon glass material, rather than a metal, also previously discussed. Also similar to stage 308, stage 628 includes a pair of surfaces or platens between every two pairs of rollers to allow the composite layer to move there between. Illustratively, the platens receive hot oil. It is appreciated that other methods of heating the platens are contemplated, similar to stage 306. After the composite layers are heated, fused, and reduced to a desired thickness, the resulting panel is cooled. Cooling stage 628 is comparable to stage 308. The final stage is shear and trim 630, which is also similar to the shear and trim stage 310 of line 300.

As shown in FIGS. 32 and 33, line 618 further includes a dual side lamination stage 636. Stage 636 is similar to stage 410, shown in FIG. 25, except for the additional uncoiling stage 638 located beneath a primary uncoiling stage 637. It is contemplated that applying a surface on both sides of a composite panel is the same as applying a single surface, as shown in FIG. 20, with the exception that warm air will be directed to both sides of the composite panel. The process as shown in FIG. 20 does apply to the lower surface as well.

Figure 36A:
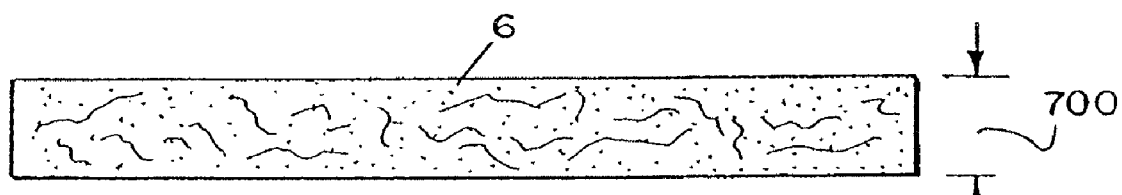
FIGS. 36a through c are sectional views of the fibrous material layer subjected to various amounts of heat and pressure.
Figure 36B:
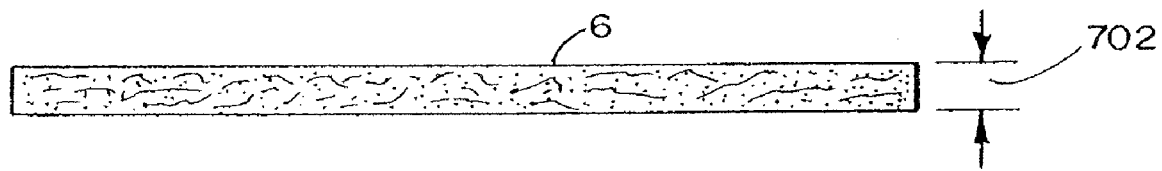
Figure 36C:
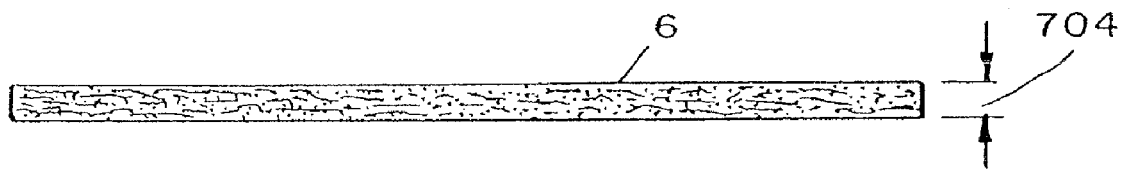

A sectional view of fibrous substitute material layer 6 is shown in FIGS. 36a through c. The distinction between the views of FIGS. 36a through c is the amount of heat and pressure applied to fibrous material layer 6. As previously discussed above, fibrous material layer 6 illustratively comprises a mat of illustratively about 25 weight percent hemp and about 25 weight percent kenaf with the balance being illustratively polypropylene. The fibers are randomly oriented to provide a nonspecific orientation of strength. Variations of this fibrous material are contemplated, including an about 24.75 weight percent hemp and about 24.75 weight percent kenaf combination with about 50 weight percent polypropylene and about 0.05 weight percent maleic anhydride. Other such fibrous materials can be used as well, such as flax and jute, for example. It is also contemplated that other blend ratios of the fibrous material can be used. It is further contemplated that other binders in place of polypropylene may also be used for the purpose discussed further herein. Still further, it is contemplated that other fibrous materials which have high process temperatures in excess of about 400 degrees F., for example, may be used as well.

The fibrous material layer 6 shown in FIG. 36a is considered a virgin version of the layer, similar to that shown in FIG. 1, or on rolls 6' and 6" shown in FIG. 22. This version of layer 6 is considered virgin, because it has not been subjected to a heat treatment or was compressed. The fibers and the binder that compose the layer exist as essentially separate constituents simply mixed together. In this state, the virgin version is highly permeable and pliable. The relative thickness 700 of the layer 6 is relatively greater than the thicknesses 702 or 704 of layers 6 shown in either FIGS. 7b and 7c, respectively. Furthermore, because the binder, polypropylene, for example, is not bound to the fiber, heating layer 6 may cause it to consolidate or shrink, particularly in its length and width.

In contrast, layer 6 shown in FIG. 36c, though comprising the same constituents as layer 6 in FIG. 36a, has been subjected considerably to heat and pressure. This embodiment of layer 6 is considered a high density version. In this case, the binder has been fully wetted-out. Fully wetted-out, for the purposes of this discussion means that the binder has, for practical purposes, all liquefied and bonded to the fibrous material of layer 6. Such produces an essentially non-permeable, dense and rigid body. The binder, typically a thermal melt polymer, like polypropylene, is melted into a liquid state, causing the polymers to adhere to and/or wet-out the fibrous materials. This can produce a consolidation of the composite when cooled which shrinks the layer. This results, however, in a rigid and dimensionally stable flat sheet. If such a layer is then reheated, because the binder is already bonded with the fibrous material, the layer will not shrink, unlike the layer 6 described in FIG. 36*a*. Such high density layers are used to produce the layers 72, 74 of truss composite 70, previously discussed with respect to FIG. 10, for example.

The version of layer 6 shown in FIG. 36*b*, in contrast to both the virgin and high density versions from FIGS. 36*a* and *c*, respectively, is considered a low density version. This low density version has been subjected to heat and pressure, so that a portion of the binder in the layer has been wetted-out, unlike the virgin version of FIG. 36*a* which has not been subjected to such a process. Furthermore, unlike the high density layer shown in FIG. 36*c*, the binder of the low density layer has not been fully wetted-out. In other words, not all of the binder in the low density layer has liquefied and bonded to the natural fibers, only a portion of the binder has. The remaining binder is still maintained, separate from the fibrous material. This makes the low density version rigid, similar to the high density version, yet, also semi-permeable, more akin to the virgin version. In one illustrative embodiment, the binder has melted and soaked into about 50 percent of the fibers that are in the layer. In this case, it is not believed that the fibers per se have grown, nor changed in a specific value. Rather, the fibers have just absorbed the binder.

The low density version can provide accelerated processing for three-dimensional molding, particularly in molding, like that shown in FIGS. 11 and 12, where various compression zones are used to form the material. Furthermore, utilizing such a composite provides lower production costs. In addition, because the layer is rigid, yet has some permeability, it can be used as a tack board alone or in conjunction with the dry erase board 150 of FIG. 15, for example. The properties also make it conducive to acoustical insulation or ceiling tiles.

Conventional heat sources such as infra red ovens are not used to heat a high density layer 6 material, because it may cause changes to its physical dimensions or cause overheating of the surface area of the high density layer 6 in order to bring the core up to proper processing temperatures. In contrast, contact heating ovens, which use upper and lower heated platens to hold a virgin layer 6 under pressure during heating to prevent significant shrinkage, are not readily available in the general molding industry that may use such materials. Furthermore, the target cycle times required to heat these layers to molding temperatures require extra energy and equipment.

Using the low density version of layer 6 can, on balance, be a more cost effective way to mold such fibrous material layers. For example, an 1800 gram per meter square sample of fibrous material, as described with respect to FIGS. 26*a* through *c*, may require about 83 seconds of heat time in a contact oven to get the virgin version up to molding temperature. The high density version may require 48 seconds of heat time in an IR oven. The low density board, however, may require only about 28 seconds of heat time in an air circulated hot air oven. This is to reach a core temperature of about 340 to 350 degrees F.

When heating the low density version in a simple air circulated hot air oven, the energy required to heat low density board is 50 percent less than the required energy to heat the layer through a contact oven and 70 percent less than the required energy to heat a consolidated hard board utilizing infra red oven. The high density layer is typically only heated by an infrared oven. This is because the high density version does not have the permeability for hot air, and contact ovens may overheat and damage the layer.

Some benefits of the high density version over the virgin version are also found in the low density version. First of all, similar to how the high density version requires less packaging space than the virgin because of its reduced thickness, the low density version too requires less packaging space since its thickness is also less than that of the virgin version. Such translates into reduced shipping costs. Secondly, because the low density version is rigid, like the high density version, the low density version can be handled much easier with mechanical devices, such as grippers and clamps. This can be more difficult with the virgin version which is more pliable. Also, the low density material does not always have to be pre-heated. Some applications of the virgin version may require the layer to be preheated so as to dimensionally stabilize the material. This is not necessary with the low density version. In contrast, for those production lines that use a needle system to handle materials, particularly, for materials like the virgin version of layer 6, the high density version would not receive such needles, because of the solidified binder. The low density version, however, still being semi-permeable, may receive such needles, allowing it to be transported easily, similar to that of the virgin version.

Manufacture of the low density version like that shown in FIG. 36*c* comprises subjecting the virgin version to both heat and pressure. The heat and pressure is illustratively provided by an oven which comprises compressed rolls that pinch the material to reduce its ability to shrink while it is being heated. The rolls have belts with holes disposed therethrough, through which the hot air passes. The layer is being held as structurally rigid as possible so it does not suck-in and become narrow and thick in the middle. The heat and pressure causes the binder to liquefy, and under the rollers, causes the melted binder to be absorbed into and surround the natural fiber. The layer may shrink to some minor extent, but that can be compensated for during this manufacturing process. When the layer is removed from the oven, cold air is blown on it to solidify the layer.

Typically, thermal melt polymers are heat sensitive, and at temperatures above 240 degrees F. will attempt to shrink (deform). Therefore, the opposing air permeable belts having opposing pressures limits the amount of heat sink shrinkage that will occur during this process. Once the initial heating has occurred (polymers changed from a solid to liquid state), and consolidation of thermal melt and non-thermal melt fibers are achieved, the consolidated layer 6 becomes thermal dimensionally stable. After heating, and while the consolidated mat is under compression between the opposing air permeable belts, the layer is chilled by ambient air being applied equally on opposite sides of the consolidated mat to, again, bring the thermal melt polymers back to a solid state.

Another illustrative embodiment of the present disclosure provides a fire retardant board and method of making the same. An illustrative embodiment of the board comprises a natural, synthetic, or blended fiber material that is formed into a board illustratively using one or more of the following: polyester, natural fiber, epoxy resin, phenol resin, dry or liquid urethane resins, polypropylene, and a fire retardant material. The resin is a binder that bonds the fibers into a board, while the fire retardant material makes the board less susceptible to flame deformation. In an illustrative embodiment, the board can be a low density board.

An illustrative embodiment of the disclosure provides a resonated fiber board comprising an epoxy resin/fire retardant material combined with a natural and/or synthetic fiber material. For example, resin/fire retardant material can be added to a fiber mat comprising approximately 85% natural fiber and approximately 15% polyester fiber. Another illustrative embodiment comprises an approximate 1100 gram per square meter (gsm) fiber mat. The mat is resonated with approximately a 50% to 50% mix of epoxy resin and fire retardant powder. The amount of resin/fire retardant material added is calculated by a percentage of the total weight of the mat as an add-on. For example, for the 1100 gsm fiber mat, a resin/powder add-on of approximately 35% is approximately 385 gsm. In these illustrative examples, the binder may be Flexlok® epoxy resin with BanFlame®, a borate fire retardant powder. These products can be obtained from Ramcon Industries in Memphis, Tenn. Alternative flame resistant powders can be used, such as the Glo-Tard® fire resistance powder, a phosphate product available from Glo-Tex Manufacturing in Spartanburg, S.C.

In another illustrative embodiment, the board can be a 100% natural fiber board. Such a board may increase the flame retardant properties, since the high calorie fuel source of the polyester and/or polypropylene is eliminated. In yet another illustrative embodiment, polyester and/or polypropylene or other synthetic fiber can be treated with a fire retardant additive, such as but not limited to approximately 5% bromide or phosphate fire retardant additive. These treated fibers can be mixed with the natural fibers and the binder/powder add-on. In still another illustrative embodiment, the natural fibers can be treated with a fire retardant additive and then formed into a mat with the resin/fire retardant powder add-on. It is believed that such embodiments may enhance the fire retardant properties. Further illustrative embodiments may include gram weights of mats ranging from approximately 300 gsm up to approximately 5000 gsm having ranges of dry or liquid urethane resins, phenol or epoxy resin percentages from approximately 10% by weight up to approximately 45% by weight in combination of flame retardant ranging from approximately 45% additive down to approximately 10% by weight, depending on the application requirement to meet certain building codes or customer mandated requirements.

The following are illustrative resin/fire retardant powder formulations which were added to approximately 1100 gsm, 85% natural/15% polyester fiber mats:
  A. Flexlok® resin/BanFlame® FR powder. (~35% add-on by weight)
  B. Flexlok® resin/GloTard® LB9-4A FR powder. (~35% add-on by weight)
  C. Flexlok® resin/GloTard® LB9-4A FR powder. (~25% add-on by weight)
  D. Flexlok® resin/GloTard® LB9-4B FR powder. (~25% add-on by weight)
  E. Flexlok® resin/GloTard® LB9-4B FR powder. (~35% add-on by weight)
  F. Flexlok® resin/GloTard® LB9-4B FR powder. (~51% add-on by weight)

Samples A through F were subjected to a ASTM International Fire Test E-84, and their results are as follows:

TABLE 1

|  | A | B | C | D | E | F |
| --- | --- | --- | --- | --- | --- | --- |
| Burn rate in mm | 15.2 | 17.4 | 17.8 | 18.6 | 16.1 | 15.7 |
| Burn length in mm after 60 seconds | 228 | 260 | 267 | 279 | 241 | 235 |
| Afterflame in seconds | SE | SE | 15 | 45 | SE | SE |

SE = Self-Extinguishing

Without the inclusion of treated polyester or polypropylene fiber, the results indicate that the composite control burn rate falls safely within the Class rating requirements as specified in UL E-84 burn rate certification. Although self-extinguishing is not a specified requirement to meet E-84, it nevertheless is another significant opportunity to improve fire safety, especially during containment.

Another test was conducted in accordance with the ASTM International Fire Test Response Standard E-84-03b, Surface Burning Characteristics of Building Materials. This test is sometimes referred to as the Steiner Tunnel Test. This test is applicable to exposed surfaces such as walls and ceilings. The test was conducted with the specimen in the ceiling position with the surface to be evaluated exposed face down to the ignition source. The ASTM E-84 test method is believed technically identical to NFPA No. 255 and UL No. 723. This standard is used to measure and describe the response of materials, products, or assemblies to heat and flame under controlled conditions.

The test provides comparative measurements of surface flame spread and smoke development of materials with that of select grade red oak and fiber-reinforced cement board, Grade II, under specific fire exposure conditions. The test exposes a nominal 24-foot long by 20-inch wide test specimen to a controlled air flow and a flaming fire which are adjusted to spread the flame along the entire length of a red oak specimen in 5.50 minutes. During the 10-minute test duration, flame spread over the specimen surface and density of the resulting smoke are measured and recorded. Test results are calculated relative to red oak, which has an arbitrary rating of 100, and fiber-reinforced cement board, Grade II, which has a rating of 0.

The test results are expressed as flame spread index and smoke developed index. The flame spread index is defined in ASTM E-176 as "a number of classification indicating a comparative measure derived from observations made during the progress of the boundary of a zone of flame under defined test conditions." The smoke developed index, a term specific to ASTM E-84, is defined as "a number or classification indicating a comparative measure derived from smoke obscuration data collected during the test for surface burning characteristics." It is believed that there is not necessarily a relationship between the two measurements. The method does not provide for measurement of heat transmission through the surface tested, the effect of aggravated flame spread behavior of an assembly resulting from the proximity of combustible walls and ceilings, or classifying a material as noncombustible solely by means of a flame spread index. The zero reference and other parameters critical to furnace operation are verified on the day of the test by conducting a 10-minute test using ¼-inch fiber-reinforced cement board, Grade II. Periodic tests using NOFMA certified ²³⁄₃₂-inch select grade red oak flooring provide data for the 100 reference.

The test samples were fiber board substrates with epoxy resin/flame retardant material added thereto. Specifically, 22.5% epoxy resin, and 22.5% fire retardant powder were added to approximately 935 grams of natural fiber and approximately 165 grams of polyester fiber. One test sample was a 35% resin/fire retardant powder add-on to the 1100 gsm mat, and the second was a 45% resin/fire retardant powder add-on to another 1100 gsm mat. The material had a thickness of 0.327-inch. The material was conditioned to equilibrium in an atmosphere with the temperature maintained at 71+/−2 degrees F. and the relative humidity at 50+/−5 percent. For testing, twelve pieces, each measuring 12"×48" placed side by side, were free laid over a 2-inch hexagonal wire mesh supported by ¼-inch diameter steel rods spanning the ledges of the tunnel furnace at 24-inch intervals. This method of auxiliary sample support is described in Appendix X1 of the E-84 standard, Guide to Mounting Methods, Sections X1.1.2.2 and X1.1.2.3.

The test results, calculated on the basis of observed flame propagation and the integrated area under the recorded smoke density curve, are presented below. The flame spread index obtained in E-84 is rounded to the nearest number divisible by five. Smoke developed indices are rounded to the nearest number divisible by five unless the Index is greater than 200. In that case, the smoke developed index is rounded to the nearest 50 points. The flame spread development data are also presented graphically below.

Specimen ignition over the burners occurred at 0.05 minute. Surface flame spread was observed to a maximum distance of 8.56 feet beyond the zero point at 1.75 minutes. The maximum temperature recorded during the test was 593 degrees F.

The flame spread index and smoke developed index values obtained by ASTM E-84 tests are frequently used by code officials and regulatory agencies in the acceptance of interior finish materials for various applications. The most widely accepted classification system is described in the National Fire Protection Association publication NFPA 101 Life Safety Code, where:

| Class A | 0-25 flame spread index | 0-450 smoke developed index |
|---|---|---|
| Class B | 26-75 flame spread index | 0-450 smoke developed index |
| Class C | 76-200 flame spread index | 0-450 smoke developed index |

Class A, B, C corresponds to Type I, II, and III respectively in other codes such as SBCCl, BOCA, and ICBG. They do not preclude a material being otherwise classified by the authority of jurisdiction. The test results were as follows and as shown in FIGS. 38 and 39:

Sample 1: 35% resin/fire retardant powder add-on
Time to ignition=00.05 minutes
Maximum flame spread distance=08.56 feet
Time to maximum spread=01.75 minutes
Flame spread index=40
Smoke developed index=25

Sample 2: 45% resin/fire retardant powder add-on
Time to Ignition=00.05 minutes
Maximum Flamespread Distance=08.27 feet
Time to Maximum Spread=02.07 minutes
Flame Spread Index=40
Smoke Developed Index=20

Both of these samples demonstrated a Class B flame spread and smoke developed index.

Another illustrative embodiment of this disclosure provides a board that has a body impregnated with fire retardant material such as borate to control the fire consumption of the body and a surface protection control to reduce combustibility thereon. The result of this is to offer flame retardant protection both internal to the board's body, as well as its surface. This provides combined protection to the board. One illustrative embodiment of such a board comprises a 1050 grm natural fiber mat that included 20% epoxy (210 grin) and 20% borate (210 grm) impregnated into the mat and cured. In this embodiment the resulting board becomes a 1470 grm board. Subsequently, a 5% liquid phosphate solution illustratively comprising about 40% solids is applied to each surface of the board. In this case, a 183 grm liquid plus solid composition is applied to each side of the board. The 5% solution comprised about 73.5 grm dry solids including the fire retardant phosphate. A sample such as this was able to be rated Class A pursuant the ASTM E-84-05 Surface Burning Characteristics of Building Materials Test. The results of such testing are represented below.

TABLE 2

| TEST SAMPLE NO. | SIDE EXPOSED | SUPPORT | CALCULATED FLAME SPREAD | CALCULATED SMOKE DEVELOPED |
|---|---|---|---|---|
| 1 | NA | WIRE & RODS | 20.00 | 12.78 |
| 2 | NA | WIRE & RODS | 21.91 | 10.26 |
| 3 | NA | WIRE & RODS | 20.17 | 13.36 |

| MATERIAL TESTED | SIDE EXPOSED | SUPPORT | FLAME SPREAD INDEX* | SMOKE DEVELOPED INDEX* |
|---|---|---|---|---|
| RED OAK FLOORING (calib) | NA | DECKS | 100 | 100 |
| REINFORCED CEMENT BOARD (calib) | NA | SELF | 0 | 0 |
| Sample | NA | WIRE & RODS | 20 | 10 |

*Flame Spread/Smoke Developed Index is the result (or average of the results of multiple tests), rounded to the nearest multiple of 5. Smoke values in excess of 200, rounded to the nearest 50.

TABLE 3

| TEST 1 | |
|---|---|
| ADC DRAFT (IN. H20) | 0.082 |
| GAS PRESS. (IN. H20) | 0.289 |
| GAS VOL, (CF) | 49.6 |
| BTU/cf | 998 |
| SHUTTER | 3" |
| TEMP. 13° BURIED | 105° F. |
| TEST METHOD: | ASTM E-84-05 |
| MATERIAL SIZE: | ⅜" × 24" × 96" |
| METHOD OF SUPPORT: | WIRE & RODS |
| REMARKS: | IGNITION @: 34 |
| | MAX. FLAME FRONT 4.5' @ 2:22 LIGHT BLUE FLAME |
| FLAME SPREAD- | 20.00 |
| AREA UNDER THE CURVE (MIN. FT.) | 38.83 |
| SMOKE DEVELOPED- | 12.78 |

| # | TIME (Min.) | TIME (Sec.) | DISTANCE (Ft.) |
|---|---|---|---|
| 1 | 0 | 34 | 0.0 |

TABLE 3-continued

TEST 1

| # | TIME (Min.) | TIME (Sec.) | DISTANCE (Ft.) |
|---|---|---|---|
| 2 | 0 | 49 | 0.0 |
| 3 | 1 | 1 | 1.0 |
| 4 | 1 | 9 | 2.0 |
| 5 | 1 | 18 | 2.5 |
| 6 | 1 | 30 | 3.0 |
| 7 | 1 | 45 | 3.5 |
| 8 | 2 | 2 | 4.0 |
| 9 | 2 | 22 | 4.5 |
| 10 | 10 | 0 | 4.5 |
| 11 | | | |
| 12 | | | |
| 13 | | | |
| 14 | | | |
| 15 | | | |
| 16 | | | |
| 17 | | | |
| 18 | | | |
| 19 | | | |
| 20 | | | |

TABLE 4

TEST 2

| | |
|---|---|
| ADC DRAFT (IN. H20) | 0.082 |
| GAS PRESS. (IN. H20) | 0.284 |
| GAS VOL (CF) | 49.58 |
| BTU/cf | 995 |
| SHUTTER | 3" |
| TEMP. 13° BURIED | 105° F. |
| TEST METHOD: | ASTM E-84-05 |
| MATERIAL SIZE: | 3/8" × 24" × 96" |
| METHOD OF SUPPORT: | WIRE & RODS |
| REMARKS: | IGNITION @: 38 |
| | MAX. FLAME FRONT 5.0' @ |
| | 2:20 LIGHT BLUE FLAME |
| FLAME SPREAD- | 21.91 |
| AREA UNDER THE CURVE (MIN. FT.) | 42.54 |
| SMOKE DEVELOPED- | 10.26 |

| # | TIME (Min.) | TIME (Sec.) | DISTANCE (Ft.) |
|---|---|---|---|
| 1 | 0 | 38 | 0.0 |
| 2 | 0 | 52 | 0.0 |
| 3 | 1 | 5 | 1.0 |
| 4 | 1 | 11 | 2.0 |
| 5 | 1 | 25 | 2.5 |
| 6 | 1 | 36 | 3.0 |
| 7 | 1 | 49 | 3.5 |
| 8 | 1 | 58 | 4.0 |
| 9 | 2 | 9 | 4.5 |
| 10 | 2 | 20 | 5.0 |
| 11 | 10 | 0 | 5.0 |
| 12 | | | |
| 13 | | | |
| 14 | | | |
| 15 | | | |
| 18 | | | |

TABLE 4-continued

TEST 2

| # | TIME (Min.) | TIME (Sec.) | DISTANCE (Ft.) |
|---|---|---|---|
| 17 | | | |
| 18 | | | |
| 19 | | | |
| 20 | | | |

TABLE 5

TEST 3

| | |
|---|---|
| ADC DRAFT (IN. H20) | 0.082 |
| GAS PRESS. (IN. H20) | 0.294 |
| GAS VOL, (CF) | 49.67 |
| BTU/cf | 998 |
| SHUTTER | 3" |
| TEMP. 13° BURIED | 105° F. |
| TEST METHOD: | ASTM E-84-05 |
| MATERIAL SIZE: | 3/8" × 24" × 96" |
| METHOD OF SUPPORT: | WIRE & RODS |
| REMARKS: | IGNITION @: 33 |
| | MAX. FLAME FRONT 4.6' @ |
| | 2:12 LIGHT BLUE FLAME |
| FLAME SPREAD- | 20.17 |
| AREA UNDER THE CURVE (MIN. FT.) | 39.17 |
| SMOKE DEVELOPED- | 13.36 |

| # | TIME (Min.) | TIME (Sec.) | DISTANCE (Ft.) |
|---|---|---|---|
| 1 | 0 | 33 | 0.0 |
| 2 | 0 | 42 | 0.0 |
| 3 | 0 | 54 | 1.0 |
| 4 | 1 | 2 | 1.5 |
| 5 | 1 | 7 | 2.0 |
| 6 | 1 | 17 | 2.5 |
| 7 | 1 | 29 | 3.0 |
| 8 | 1 | 44 | 3.5 |
| 9 | 1 | 52 | 4.0 |
| 10 | 2 | 12 | 4.5 |
| 11 | 10 | 0 | 4.5 |
| 12 | | | |
| 13 | | | |
| 14 | | | |
| 15 | | | |
| 16 | | | |
| 17 | | | |
| 18 | | | |
| 19 | | | |
| 20 | | | |

Other embodiments that passed a Class A rating are those that included a fire retardant surface coating using about 30% (solids) polyphosphate and about 37% (solids) liquid borate. It is appreciated from these formulations that the more complete coverage of the surface by the fire retardant material there is, the better the surface protection characteristics are. Illustratively ranges of the material and chemistry makeup for illustrative fire retardant boards are provided in the following Table 6;

TABLE 6

Illustrative Material and Chemistry Make Up Combinations for Fire Retardant Boards

| | | | Range from | Range to | |
|---|---|---|---|---|---|
| Base weight of Mat pre Resin Application | | gr/m² | 600 | 2400 | |
| Composition of Basic Mat. | | | | | |
| Natural Fiber | Types: | % base wt. | 20 | 100 | Value in Product |
| | Jute | | | | Clean fiber, cut length, product all |

TABLE 6-continued

|  |  |  |  |  |  |  |
|---|---|---|---|---|---|---|
|  | Tossa |  |  |  | natural fiber mat.<br>Clean fiber, cut length, produce all natural fiber mat. |  |
|  | Kenal |  |  |  | Domestic source, not available if clean quality or cut length. |  |
|  | Ramine |  |  |  | Clean fiber, not available in cut length, week in tensile strength. |  |
|  | Sisal |  |  |  | Clean fiber, high natural stiffness, high fiber odor. |  |
|  | Hemp |  |  |  | Clean fiber, high tensile strength, high fiber odor. |  |
|  | Flax |  |  |  | Clean fiber, high fiber odor, residue fiber oil content. | Post Treated |
| Synthetic Fiber | Types: | % base wt. | 0 | 20 | Value in Product | Flamability |
|  | Rayon |  |  |  | Cellulous fiber, cut length, crimp to improve processing, high absorbent rate. | low |
|  | Polyester |  |  |  | Polymer fiber, high pyrolisis temperature, crimp to improve processing. | medium |
|  | Nylon |  |  |  | Polymer fiber, highest pyrolisis temperature, crimp to improve processing | medium |
|  | Polyethylene |  |  |  | Polymer fiber, low pyrolisis temperature, crimp to improve processing. | high |
|  | Polypropylene |  |  |  | Polymer fiber, low pyrolisis temperature, crimp to improve processing. | high |
| Maximum Impregnation of Resin, Flame Retardant or a Combination of - 40% | | | | | | |
| Impregnated Resin Application post Mat. | % of Base wgt. |  | Range from 5 | Range to 40 |  |  |
| Resin | Types:<br>Epoxy Pwdr<br>Epoxy Liquid<br>Urethane<br>Phenol<br><br>Latex |  |  |  | Applied by air/vacuum.<br>Dip coated, sprayed or vacuum pulled.<br>Dip coated, sprayed or vacuum pulled.<br>Dip coated, sprayed or vacuum pulled.<br>Considered non viable due to formaldehyde off gas.<br>Dip coated, sprayed or vacuum pulled. |  |
| Impregnate Flame Retardant post Mat. | % of Base Weight |  | 5 | 30 |  |  |
|  |  | Degrading Temperature |  | Flame control method |  |  |
| Retarandant | Borate<br>Poly Phosphate<br>Ammonia Phosphate<br>Zince Borate | above 300° F.<br>above 300° F.<br>above 300° F.<br><br>above 400° F. | Antimony<br>Intumescent<br>Intumescent<br><br>Antimony | water release, char forming<br>char forming.<br>chlorine gas release, char forming.<br><br>char forming. |  |  |
| Surface Application of Flame Retardant | | | | | | |
| Post Applied after Resin Cure. | % of Post Cure Weight |  | Range from 10 | Range to 30 |  |  |
|  |  | Degrading Temperature |  | Flame control method |  |  |
| Retarandant Types: Liquid | Tetra Borate Pentahydride<br>Poly Phosphate<br>Ammonia Phosphate | above 300° F.<br><br>above 300°<br>above 300° F. | Antimony<br><br>Intumescent<br>Intumescent | water release, char forming. Contains surfactant and adhesive in formulation<br>char forming. Contains surfactant in formulation.<br>chlorine gas release, char forming. Contains surfactanat and adhesive in formulation. |  |  | note:
all surface materials are illustratively liquid applied. Application can be achieved by Spray, Kiss Coating or Roll Coating. Spray application works for irregular surfaces. Fine droplets penetrate the deeper surface area providing full surface coverage. Surfactants are used to break down surface tension of composite post cure to support rapid absorption of liquid into cellulous materials. Non flammable adhesives are used to reduce post drying losses of retardants due to shipping, handling and assembly. Adhesives may also reduce drying time. Percent of active retardant dry solids content in liquid range between 20% to 50%.

It is believed that the borate inside the interior or thickness of the board expands when exposed to heat. As this happens the borate surrounds the fibers in the board. Because the borate is non flammable, it provides a barrier between the flame and the fibers. The borate may also shield the fibers from oxygen and heat. An embodiment of the disclosure includes providing enough borate or other fire retardant material in the board so the fire retardant material can protect the board and retard the flame propagation.

The following illustrative powder resonating process to make such fire retardant mats comprises four primary components: 1) the powder feeding system, 2) the powder feed box, with overflow powder recycling, 3) a belt conveyor, and 4) an oven, an edge trim line, cross cutting and packaging of sheeted product.

The powder feeding system is illustratively made up of 2 or more auger feeders that disperse the powders via loss in weight screw augers or loss in weight feed belts pneumatically by transfer piping to the powder feed box in the desired ratio and volume. The powder feed box disperses the powder (s) onto the substrate using negative pressure created by a vacuum system. There is an upper chute where the powders are fed and the belt conveyor is located there between to carry the substrate material through the feed box. The vacuum system, located below, pulls the powders through the substrate with the negative pressure. (This system may allow for as much as a 98% recovery of all unused powder and can be routed back into the delivery system.)

From the powder feed box, the resonated material proceeds on the belt conveyor through an oven to activate and cure the epoxy resin portion of the powder. Once the material exits the oven, the thermoset epoxy resin is cured and acts as polypropylene to transform the mat material into a semi-rigid board. The epoxy resin, however, may not be softened by re-heating like polypropylene, which is a thermoplastic resin.

Figure 37:
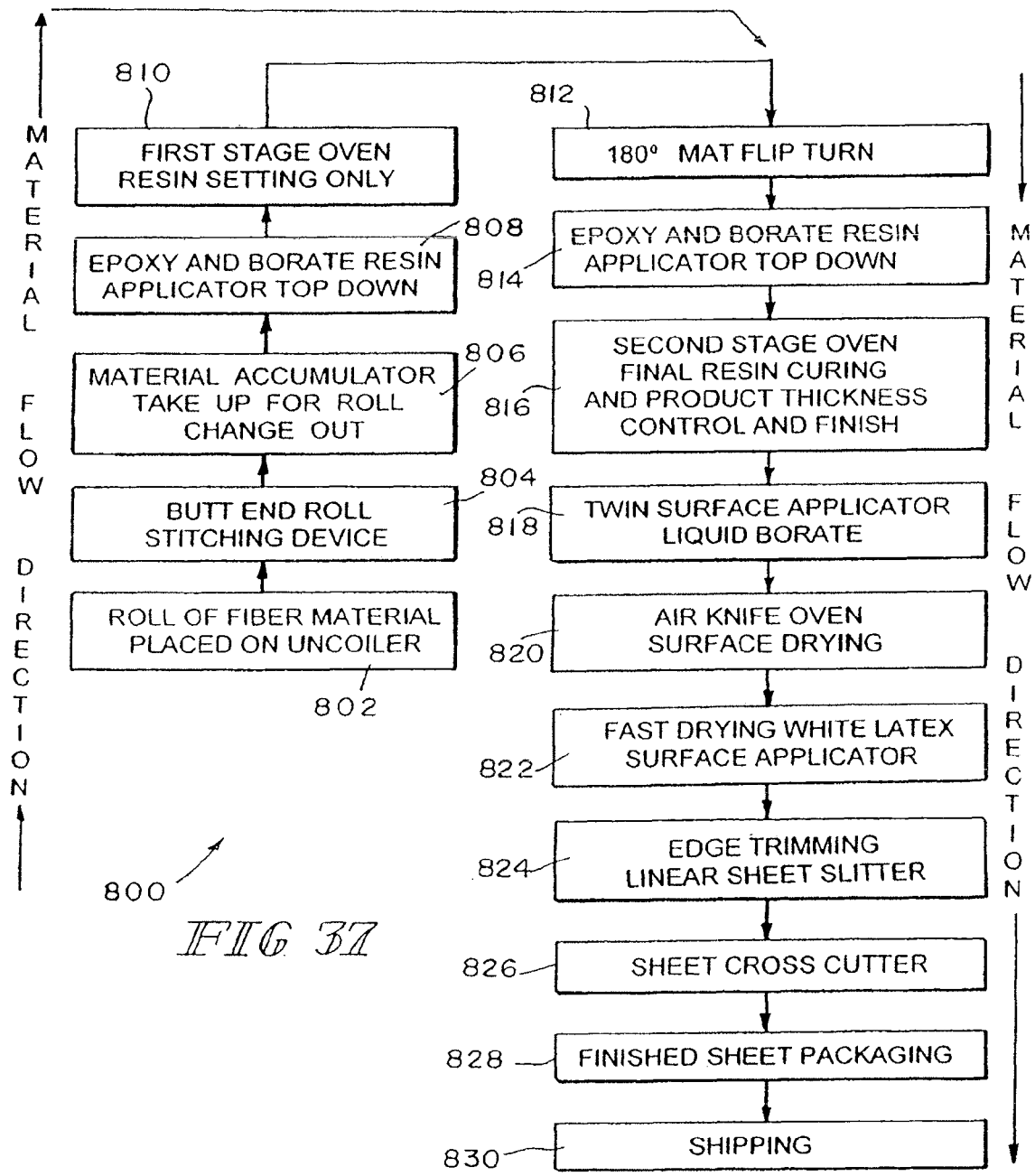
FIG. 37 is a chart showing an illustrative manufacturing process for a fire retardant structural board.

An illustrative manufacturing process 800 of an illustrative embodiment of the fire retardant board is shown in a chart in FIG. 37. In the embodiment shown, a non-woven structural mat, is provided in rolled form at 802. As shown at 804, the butt end of the roll is joined and stitched to successive rolls to create a continuous line of matting. Material accumulator 806 assists in ensuring the continuous line of matting through the process. This is particularly useful when rolls are required to be changed out. At 808, epoxy and borate powder is blown into the thickness of the mat from its top surface. In an illustrative embodiment, not only is the powder blown onto the mat, but also a vacuum is applied under the mat to draw the powder farther into the thickness of the mat. Furthermore, an illustrative loss in weight blending system is used to feed any lost powder back through the system to be applied to the mat later. The mat is then subjected to a first stage oven for resin setting at reference numeral 810. Illustratively, this can be a three-meter top-down hot air oven for light curing. The curing temperature is about 350° F. and the mat is subjected to this temperature for about 30 seconds. The result is a partial cure to gel of the epoxy near the surface of the mat, as opposed to the core.

The mat is then flipped over 180° at 812 and more epoxy and borate powder is applied top-down at 814. This step may also cause the mat to flatten out if any bowing occurred during the initial heat stage at 810. In this illustrative embodiment, powder that was lost during the original application at 808 is fed through and applied to the mat at 814. The mat is then subjected to a second stage resin curing process at 816. At this stage, an illustrative six-meter oven with top-down and bottom-up hot air at about 350° F. cures the epoxy and borate. In one illustrative embodiment, the mat is subjected to this temperature for one minute. In addition, this stage may also include a thickness control with finishing calendar rolls to control the thickness of the resulting board. A top coat of liquid borate can be applied to one or both surfaces of the board illustratively using an off-line liquid storage and pump system. In another illustrative embodiment, there can be 7-10% solids with the balance being water, a surfactant, and/or an adhesive. At 820, the surface of the panel can be flashed dried. In an alternative embodiment, and for esthetic purposes, an optional fast drying latex coating can be applied to the surface of the board. Steps 824 through 830 are conventional panel processing steps including edge trimming and sheet slitting along with cross-cutting, finishing, packaging, and lastly shipping at 830.

Another illustrative embodiment includes a triglycidyle isocyanurate (TGIC) polyester resin that may be used with the previously-described fire-retardant formulations. The TGIC polyester resin includes calcium carbonate and 1,3,5-Triglycidyle Isocyanurate. The fire-retardant/resin component previously described may be substituted with this resin. In an illustrative embodiment, the TGIC resin may be blended with a flame retardant such as sodium borate penta hydride. Both materials in powder form may have similar particle sizes which allow for homogenous mixing. In addition, the resin may have a first melting point of about 55 degrees Celsius and a second melting point of about 85 degrees Celsius. This means that if the resin is exposed to a first heat application it melts at the lower first melt temperature. If the resin is then exposed to a second heat application after cooling from the first heat application, the resin melts at the higher melt temperature. The resin may fully cross link in about 10 minutes at about 150 degrees Celsius. In this time the endothermic reaction should be completed. The resin may also be used as an adhesive to bond the fibrous material together. In alternative embodiments, variations of blend mixes combining TGIC resin with sodium borate pentahydride may achieve desired end product mechanical values without compromising flame control. The amount of sodium borate pentahydride application rate should not be less than 30% by weight of total product weight in order to maintain flame spread control. Total product weight includes the total weight of fibrous mat along with added TGIC resin weight. For example, a fibrous mat having a pre-impregnation weight of about 1000 grams per square meter should include a TGIC resin application rate at about 20% of the fibrous mat weight or about 200 grams per square meter. Accordingly, the total fibrous mat weight impregnated with TGIC resin is about 1200 grams per square meter. To achieve a Class A flame spread rating, it is believed that at least 30% sodium borate pentahydride (e.g., 1200×1.3=1560−1200=360 grams active sodium borate) should be added to the fibrous TGIC resin mat mixture.

In an illustrative embodiment, the application of sodium borate pentahydride may be applied in two parts. The first part includes depositing the TGIC resin in powder form into the fibrous mat matrix. In one embodiment, about 67% of the total sodium borate pentahydride is applied this way. With the fibrous mat impregnated, the second part is applying about 33% on the fibrous mat surface or surfaces using an aqueous mixture of dissolved sodium borate pentahydride which may include about 40% dry solid load rate, about 1% surfactant to improve surface wicking on aqueous mixture into mat matrix, about 1% water soluble adhesive to promote binding of sodium borate pentahydride to fibrous matrix, and the balance water. In another embodiment, a blend of epoxy powder resin may be used as a substitute for TGIC resin for applications requiring higher heat exposures above 150 degrees Celsius. Amounts of TGIC or Epoxy resin may also depend on the product stiffness requirements. It is believed that amounts of resin may range from about 5% to about 40% of the fibrous mat weight with about 20% application rate meeting many panel application requirements. This is because in addition to providing flame spread control, liquid applied sodium borate pentahydride may add to board stiffness after re-crystallization.

An illustrative process of applying heat and time to adequately activate the resin includes: providing a base fibrous mat having an illustrative weight of about 1000 grams per square meter; applying a first application of TGIC/sodium borate powder at a rate of about 200 grams per square meter of total fibrous mat weight and heating the resin for 30 seconds at 175 degrees Celsius using hot air recirculating ovens; applying a second application of TGIC/sodium borate powder on the reverse side of the fibrous mat at rate of 200 grams per square meter of total fibrous mat weight and heating the resin for about 60 seconds at 175 degrees Celsius. The second heat application is longer than the first in order to achieve same cross linking values on the second applied resin as achieved by first application resin. Upon exiting of the second heat oven, the fibrous resin/borate matrix may be consolidated illustratively using a dual belt compression press setting the matrix final thickness, smoothening its surfaces and removing heat to allow the resins to solidify. This makes the resin a binding adhesive. Upon exiting the dual belt press, the surface application of sodium borate pentahydride is applied to one or both sides of the panel. The application can be achieved either using a surface spray applicator, or by using a foam generator system which foams the aqueous mix of sodium borate pentahydride liquid into an applicable foam density, dispersing the foam onto the surface of the panel either on one side or both sides. Illustratively, the foam may be designed to collapse within a short time (less than 5 seconds, for example) after it has been applied to the matrix surface. Controlling the rate of foam collapse may allow the liquid solution to wick into the surface of the matrix and penetrating the same before being exposed to hot air to solidify the same prior to cutting and packaging. It can be appreciated that the process steps shown in the illustrative manufacturing process of FIG. 37 can be analogous to this manufacturing process.

The following results are based on E-84 testing completed by NGC Testing Services, Buffalo N.Y.:

Flame Spread Index average of samples tested to date was about 16.90 (Class A).

Smoke generation average of samples tested to date was about 126.77 (Class A).

Illustratively, the fibrous mat may comprise about 85% natural bast fiber and about 15% polyester tying fiber having gram weights per square meter ranging from about 200 to about 1500. Other ranges can be from about 50% to about 100% natural bast fiber combined with a suitable synthetic fiber having a melt temperature above about 200 degrees Celsius ranging from 0% up to 50% of total weight. The TGIC or Epoxy powder resin may have an application rate of about 20% or more of the total fibrous mat weight. Other application rates may range from 5% up to 40% of total fibrous mat weight. Powdered sodium borate pentahydride application rate may be at least 20% of the total combined weight of fibrous mat and applied resin. Another flame retardant such as sodium borate deca-hydrate as well as other flame retardants having similar activation temperatures and control methods may work as well.

In another illustrative embodiment the TGIC polyester resin may also include a hardener additive that bonds with polyester to elevate the first and second melting point temperatures. The first melting point may be about 55 degrees Celsius and the second melting point temperature may be about 176 degrees Celsius. The TGIC polyester resin is a thermal set resin with catalyst blended in. An endothermic polymer is provided that uses an exothermic source to trigger the chemical reaction.

In still another illustrative embodiment, sodium borate pentahydride powder can be used to impregnate the mats of the type previously described. (See Table 6.) The sodium borate pentahydride powder used is a Neobor powder provided by U.S. Borax Company at 5 mol and contains $B_2O_3$, $NA_2O$, $NA_2B_4O_7.5H_2O$, chloride as CL, FE, and sulfate as $SO_4$. Also, is may be appreciated that although the TGIC polyester resin may provide the majority of a board's stiffness, the liquid borate application on each surface of the board may also enhance that stiffness. The borate may add stiffness as it transforms from a liquid to a solid with some of the liquid absorbing into the fiber cells where it recrystallizes.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed:

1. A method of manufacturing a fire retardant structural board, the method comprising the steps of:
   (a) providing a structural mat constructed of randomly oriented fibrous material having a weight, thickness, and first and second surfaces;
   (b) orienting the structural mat to expose its first surface;
   (c) applying a first application of at least one of polyester, epoxy resin, phenol resin, urethane or polypropylene binder and a fire retardant onto the first surface and into the thickness of the structural mat;
   (d) heating the structural mat to only partially cure the binder applied onto the first surface;
   (e) turning the structural mat over to expose its second surface;
   (f) applying a second application of the binder and the fire retardant onto the second surface and into the thickness of the structural mat;
   (g) heating the second surface of the structural mat to cure the binder applied onto the first and second surfaces and compressing the mat to a desired thickness; and
   (h) coating the second surface of the structural mat with a liquid fire retardant composition;
   (i) flash drying the liquid composition wherein the resulting fire retardant structural board having a class A burn rate certification as specified in the NFPA 101 life safety code or its equivalent; and
   (j) wherein steps are performed in sequential order: (a), (b), (c), (d), (e), (f), (g), (h), and (i).

2. The method of manufacturing the fire retardant structural board of claim 1, wherein the binder is triglycidyl polyester which comprises calcium carbonate and 1,3,5-triglycidyl isocyanurate.

3. The method of manufacturing the fire retardant structural board of claim 1, wherein the fire retardant is sodium borate pentahydride and is in an amount of about 30% or more of the total weight of the board.

4. The method of manufacturing the fire retardant structural board of claim 1, wherein about 67% by weight of the fire retardant is dispersed between individual fibers throughout the thickness of the body, and wherein about 33% may be applied to at least the first surface of the body.

5. The method of manufacturing the fire retardant structural board of claim 1, wherein the liquid fire retardant composition is an aqueous composition which also includes a surfactant, an adhesive, and water.

6. The method of manufacturing the fire retardant structural board of claim 5, wherein the aqueous composition further comprises about 40% sodium borate pentahydride as dry solids, about 1% surfactant, about 1% adhesive, and the balance water.

7. The method of manufacturing the fire retardant structural board of claim 1, wherein the binder is triglycidyl polyester further being a resin formulated to be about 5% to about 40% of the weight of the fibrous material.

8. The method of manufacturing the fire retardant structural board of claim 1, wherein about 50% to about 100% by total weight is fibrous material, and comprises about 0% to about 50% by total weight synthetic fiber having a melting temperature above about 200 degrees.

9. The fire retardant structural board of claim 1, wherein the binder further comprises a hardener.

10. A method of manufacturing a fire retardant structural board, the method comprising the steps of:
 (a) providing a structural mat constructed of randomly oriented fibrous material having a weight, thickness, and first and second surfaces;
 (b) orienting the structural mat to expose its first surface;
 (c) applying a first application of at least one of polyester, epoxy resin, phenol resin, urethane or polypropylene binder and a fire retardant onto the first surface and into the thickness of the structural mat;
 (d) heating the structural mat to only partially cure the binder applied onto the first surface;
 (e) turning the structural mat over to expose its second surface;
 (f), applying a second application of the binder and the fire retardant onto the second surface and into the thickness of the structural mat;
 (g) heating the second surface of the structural mat to cure the binder applied onto the first and second surfaces and compressing the mat to a desired thickness; and
 (h) wherein steps are performed in sequential order: (a), (b), (c), (d), (e), (f), and (g).

11. A method of manufacturing a fire retardant structural board, the method comprising the steps of:
 (a) providing a structural mat constructed of randomly oriented fibrous material having a weight, thickness, and first and second surfaces;
 (b) orienting the structural mat to expose its first surface;
 (c) applying a first application of a binder and a fire retardant onto the first surface and into the thickness of the structural mat;
 (d) heating the structural mat to only partially cure the binder applied onto the first surface;
 (e) turning the structural mat over to expose its second surface;
 (f) applying a second application of the binder and the fire retardant onto the second surface and into the thickness of the structural mat;
 (g) heating the second surface of the structural mat to cure the binder applied onto the first and second surfaces and compressing the mat to a desired thickness; and
 (h) wherein steps are performed in sequential order: (a), (b), (c), (d), (e), (f), and (g).

12. The method of manufacturing the fire retardant structural board of claim 11, further comprising the steps of applying the first application of binder and fire retardant at a rate of about 200 grams per square meter of total fibrous mat weight, and heating the mat for about 30 seconds at about 175 degrees Celsius using a hot air recirculating oven.

13. The method of manufacturing the fire retardant structural board of claim 12, further comprising the steps of applying the second application of binder and fire retardant onto the second surface of the structural mat at rate of about 200 grams per square meter of total fibrous mat weight, and heating the resin for about 60 seconds at about 175 degrees Celsius.

14. The method of manufacturing the fire retardant structural board of claim 11, further comprising the steps of cooling the structural mat after compressing and before coating.

15. The method of manufacturing the fire retardant structural board of claim 11, further comprising a step of coating the first surface of the structural mat with a liquid composition that includes sodium borate penta hydride.

16. The method of manufacturing the fire retardant structural board of claim 15, further comprising the step of coating the first surface using a surface spray applicator.

17. The method of manufacturing the fire retardant structural board of claim 15, further comprising the step of coating the first surface using a foam generator system which foams a composition of sodium borate pentahydride liquid fire retardant into an applicable foam density, and dispersing the foam onto the first surface where the foam collapses at a rate that allows the composition to wick into the surface of the mat.

18. The method of manufacturing the fire retardant structural board of claim 17, further comprising the step of warming the first surface to solidify the composition.

* * * * *